United States Patent
Chen et al.

(10) Patent No.: US 12,218,591 B2
(45) Date of Patent: Feb. 4, 2025

(54) SWITCHING POWER CONVERTER AND CONVERSION CONTROL CIRCUIT THEREOF

(71) Applicant: Richtek Technology Corporation, Hsinchu (TW)

(72) Inventors: Po-Yen Chen, Hsinchu (TW); Hsing-Shen Huang, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 252 days.

(21) Appl. No.: 18/145,863

(22) Filed: Dec. 23, 2022

(65) Prior Publication Data

US 2023/0231478 A1    Jul. 20, 2023

Related U.S. Application Data

(60) Provisional application No. 63/301,057, filed on Jan. 20, 2022.

(30) Foreign Application Priority Data

Oct. 12, 2022   (TW) .................................. 111138645

(51) Int. Cl.
*H02M 1/00*       (2007.01)
*H02M 3/156*      (2006.01)
(Continued)

(52) U.S. Cl.
CPC ......... *H02M 3/157* (2013.01); *H02M 1/0022* (2021.05); *H02M 1/0054* (2021.05); *H02M 3/158* (2013.01); *H02M 3/156* (2013.01)

(58) Field of Classification Search
CPC ............. H02M 1/0003; H02M 1/0009; H02M 1/0016; H02M 1/0022; H02M 1/0025;
(Continued)

(56) References Cited

U.S. PATENT DOCUMENTS

2008/0298092 A1* 12/2008 Sugahara .......... H02M 3/33507
                                                 363/21.01
2008/0309312 A1* 12/2008 Lin ................... H02M 3/33507
                                                 323/318

(Continued)

*Primary Examiner* — Thienvu V Tran
*Assistant Examiner* — Shahzeb K Ahmad
(74) *Attorney, Agent, or Firm* — Huan-Yi Lin

(57) ABSTRACT

A conversion control circuit, configured to control a switching power converter, includes a trigger signal generation circuit, an on-time control circuit, and a logic driver circuit. The trigger signal generation circuit is configured to generate a turn-on trigger signal. The on-time control circuit is configured to generate a turn-off trigger signal to determine the on-time and/or the off-time of a pulse width modulation (PWM) signal, and adjusts the on-time and/or the off-time according to the input voltage and the output voltage, such that the switching frequency of the switching power converter is adaptively adjusted according to a ratio between the output voltage and the input voltage. The logic driver circuit is configured to generate the PWM signal according to the turn-on trigger signal and the turn-off trigger signal, wherein the turn-on trigger signal enables the PWM signal, and the turn-off trigger signal disables the PWM signal.

15 Claims, 14 Drawing Sheets

(51) Int. Cl.
*H02M 3/157* (2006.01)
*H02M 3/158* (2006.01)

(58) Field of Classification Search
CPC ............. H02M 1/0035; H02M 1/0054; H02M 1/0096; H02M 1/36; H02M 1/38; H02M 1/385; H02M 3/156; H02M 3/1566; H02M 3/157; H02M 3/158; H02M 3/1582; H02M 3/1584; H02M 3/1586; H02M 3/335; H02M 3/33507; H02M 3/33515; H02M 3/33569; H02M 3/33571; H02M 3/33573
See application file for complete search history.

(56) References Cited

U.S. PATENT DOCUMENTS

| | | | | |
|---|---|---|---|---|
| 2010/0079123 A1* | 4/2010 | Miyamae | ............... | H02M 3/158 323/282 |
| 2013/0069613 A1* | 3/2013 | Nakase | ................. | H02M 3/156 323/284 |
| 2018/0375429 A1* | 12/2018 | Trichy | ................. | H02M 3/158 |
| 2019/0238054 A1* | 8/2019 | Flaibani | ................. | H02M 3/156 |
| 2020/0280256 A1* | 9/2020 | Du | ......................... | G06F 1/3296 |
| 2022/0239228 A1* | 7/2022 | Fukushima | ......... | H02M 3/1588 |
| 2022/0407421 A1* | 12/2022 | Kawano | ................. | H02M 3/158 |

* cited by examiner

SWITCHING POWER CONVERTER AND CONVERSION CONTROL CIRCUIT THEREOF

CROSS REFERENCE

The present invention claims priority to U.S. 63/301,057 filed on Jan. 20, 2022 and claims priority to TW 111138645 filed on Oct. 12, 2022.

BACKGROUND OF THE INVENTION

Field of Invention

The present invention relates to a switching power converter; particularly, it relates to a switching power converter capable of adaptively adjusting its switching frequency. The present invention also relates to a conversion control circuit for the switching power converter.

Description of Related Art

Please refer to FIG. 1. FIG. 1 shows a schematic diagram of conversion efficiency between an input power and an output power of a conventional switching power converter (e.g., a buck converter). The horizontal axis of FIG. 1 is conversion ratio CR, wherein the conversion ratio CR is the quotient of an output voltage Vout of the output power divided by an input voltage Vin of the input power; the vertical axis of FIG. 1 is conversion efficiency CE. The prior art adopts pulse width modulation (PWM) control with a constant frequency and a constant on-time. As shown in FIG. 1, when the conversion ratio CR is between a first conversion ratio threshold Dth1 and a second conversion ratio threshold Dth2, the conversion efficiency CE can be maintained above a level. However, when the conversion ratio CR is higher than the first conversion ratio threshold Dth1 or lower than the second conversion ratio threshold Dth2, the conversion efficiency CE is not satisfactory.

In view of the above, the present invention proposes a switching power converter and a conversion control circuit thereof, which can adaptively adjust the switching frequency of the switching power converter according to the conversion ratio, thereby improving the conversion efficiency.

SUMMARY OF THE INVENTION

The present invention provides a conversion control circuit for use in a switching power converter configured to convert an input power to an output power, wherein the switching power converter includes a plurality of switches, the conversion control circuit comprising: a trigger signal generation circuit, configured to generate a turn-on trigger signal according to a feedback signal relevant to the output power; an on-time control circuit, configured to generate a turn-off trigger signal to determine an on-time and/or an off-time of a pulse width modulation (PWM) signal, wherein the PWM signal is configured to control the plurality of switches, such that at least one of the plurality of switches is periodically turned on according to the on-time and/or the off-time; and a logic driver circuit, configured to generate the PWM signal according to the turn-on trigger signal and the turn-off trigger signal, wherein the turn-on trigger signal is configured to enable the PWM signal, and the turn-off trigger signal is configured to disable the PWM signal; wherein the on-time control circuit adjusts the length of the on-time and/or the length of the off-time according to an input voltage of the input power and an output voltage of the output power, wherein when a conversion ratio between the output voltage and the input voltage is higher than a first conversion ratio threshold, a switching frequency of the PWM signal decreases as the conversion ratio increases, and/or when the conversion ratio is lower than a second conversion ratio threshold, the switching frequency decreases as the conversion ratio decreases; wherein the value of the output voltage is lower than the value of the input voltage; the conversion ratio is a quotient of the value of the output voltage divided by the value of the input voltage; and the first conversion ratio threshold is higher than the second conversion ratio threshold; wherein the switching frequency is inversely proportional to a total of the on-time and the off-time.

In some embodiments, the trigger signal generation circuit includes: an error amplifier circuit, configured to amplify a difference between the feedback signal and a first reference voltage to generate an error amplified signal; a ramp signal generation circuit, configured to generate a first ramp signal; and a first comparison circuit, configured to compare the first ramp signal and the error amplified signal to generate the turn-on trigger signal.

In some embodiments, the on-time control circuit includes: an integration current source, configured to generate an integration current; an integration capacitor, configured to generate a second ramp signal according to the integration current; a reset switch, configured to reset the second ramp signal when the PWM signal is disabled; a second comparison circuit, configured to compare the second ramp signal and a second reference voltage to generate the turn-off trigger signal, thereby determining the length of the on-time and/or the length of the off-time; and an adjusting current source, coupled to the integration capacitor, the adjusting current source being configured to generate an adjusting current to adjust the length of the on-time and/or the length of the off-time, wherein the level of the adjusting current is determined by the input voltage and the output voltage.

In some embodiments, when the conversion ratio is lower than the first conversion ratio threshold and/or higher than the second conversion ratio threshold, and when the integration current is proportional to the input voltage and the second reference voltage is proportional to the output voltage, the switching frequency is a constant value.

In some embodiments, when the conversion ratio is higher than the first conversion ratio threshold and/or the conversion ratio is lower than the second conversion ratio threshold, the adjusting current adjusts the length of the on-time and/or the length of the off-time according to a variation of the conversion ratio.

In some embodiments, when the conversion ratio is lower than the first conversion ratio threshold and/or the conversion ratio is higher than the second conversion ratio threshold, the value of the adjusting current is 0.

In some embodiments, when the conversion ratio is higher than the first conversion ratio threshold, the adjusting current source determines the adjusting current according to a first predetermined transconductance value corresponding to the input voltage and a second predetermined transconductance value corresponding to the output voltage, thereby adjusting the on-time and/or the off-time to satisfy one of the following relationships, such that the switching frequency decreases as the conversion ratio increases: that the differential value of the on-time to the conversion ratio and the differential value of the off-time to the conversion ratio are both higher than 0; that one of the differential value of the on-time to the conversion ratio and the differential value of the off-time to the conversion ratio is 0 and the other is higher than 0; or that one of the differential value of the on-time to the conversion ratio and the differential value of the off-time to the conversion ratio is positive and the other is negative, wherein the differential value with a positive value is higher than the absolute value of the differential value with a negative value. And, when the conversion ratio is lower than the second conversion ratio threshold, the adjusting current source determines the adjusting current according to a third predetermined transconductance value corresponding to the output voltage and a fourth predetermined transconductance value corresponding to the input voltage, thereby adjusting the on-time and/or the off-time to satisfy one of the following relationships, such that the switching frequency decreases as the conversion ratio decreases: that the differential value of the on-time to the conversion ratio and the differential value of the off-time to the conversion ratio are both lower than 0; that one of the differential value of the on-time to the conversion ratio and the differential value of the off-time to the conversion ratio is 0 and the other is lower than 0; or that one of the differential value of the on-time to the conversion ratio and the differential value of the off-time to the conversion ratio is positive and the other is negative, wherein the absolute value of the differential value with a negative value is higher than the differential value with a positive value.

In some embodiments, when the conversion ratio is higher than the first conversion ratio threshold, the length of the off-time is a constant value.

In some embodiments, when the conversion ratio is lower than the second conversion ratio threshold, the length of the on-time is a constant value.

In some embodiments, the adjusting current source includes a first sub-current source and/or a second sub-current source, the first sub-current source being configured to generate a first sub-current, and the second sub-current source being configured to generate a second sub-current, wherein the first sub-current is configured to adjust the switching frequency when the conversion ratio is higher than the first conversion threshold, such that the switching frequency decreases as the conversion ratio increases; and the second sub-current is configured to adjust the switching frequency when the conversion ratio is lower than the second conversion threshold, such that the switching frequency decreases as the conversion ratio decreases.

In some embodiments, the first sub-current source includes: a first transconductance circuit, configured to a first transconductance circuit, configured to generate a first transconductance current according to the input voltage; a second transconductance circuit, configured to generate a second transconductance current according to the output voltage; and a first mirror circuit, configured to generate the first sub-current by mirroring a difference between the second transconductance current and the first transconductance current; wherein, when the value of the second transconductance current is higher than the value of the first transconductance current, the value of the first sub-current is proportional to the difference between the second transconductance current and the first transconductance current; and when the value of the second transconductance current is lower than the value of the first transconductance current, the value of the first sub-current is 0; wherein the second sub-current source includes: a third transconductance circuit, configured to generate a third transconductance current according to the output voltage; a fourth transconductance circuit, configured to generate a fourth transconductance current according to the input voltage; and a second mirror circuit, configured to generate the second sub-current by mirroring a difference between the fourth transconductance current and the third transconductance current; wherein, when the value of the fourth transconductance current is higher than the value of the third transconductance current, the value of the second sub-current is proportional to the difference between the fourth transconductance current and the third transconductance current; and when the value of the fourth transconductance current is lower than the value of the third transconductance current, the value of the second sub-current is 0.

In some embodiments, the first conversion ratio threshold is the conversion ratio when the value of the first sub-current turns to 0, and the second conversion ratio threshold is the conversion ratio when the value of the second sub-current turns to 0.

In some embodiments, the conversion control circuit is operable in a deep sleep mode, wherein the deep sleep mode includes: entering a sleep mode when an inductor current of the inductor turns to 0 and the output voltage is higher than a deep sleep threshold; and stop providing a bias current to at least one of the error amplifier circuit, the ramp signal generation circuit or the first comparison circuit during the sleep mode.

In some embodiments, under a condition wherein an output current of the output power is lower than a predetermined light load level, when the conversion ratio is higher than the first conversion ratio threshold and/or lower than the second conversion ratio threshold and the decrease amplitude of the switching frequency is higher than an adjusting threshold such that the inductor current becomes 0, the value of the output voltage is higher than the deep sleep threshold.

The present invention also provides a switching power converter, comprising: a power stage circuit, which is configured to convert an input power to an output power, the power stage circuit includes a plurality of switches and an inductor; a conversion control circuit, which is configured to generate a pulse width modulation (PWM) signal according to a feedback signal, and control the switching of the plurality of switches according to an on-time of the PWM signal, thereby operating the conversion between the input power and the output power; and a feedback circuit, which is configured to generate the feedback signal according to the output power, wherein the conversion control circuit includes: a trigger signal generation circuit, configured to generate a turn-on trigger signal according to the feedback signal; an on-time control circuit, configured to generate a turn-off trigger signal to determine an on-time and/or an off-time of the PWM signal; and a logic driver circuit, configured to generate the PWM signal according to the turn-on trigger signal and the turn-off trigger signal, wherein the turn-on trigger signal is configured to enable the PWM signal, and the turn-off trigger signal is configured to disable the PWM signal; wherein the on-time control circuit adjusts the length of the on-time and/or the length of the off-time according to an input voltage of the input power and an output voltage of the output power, wherein when a conversion ratio between the output voltage and the input voltage is higher than a first conversion ratio threshold, a switching frequency of the PWM signal decreases as the conversion ratio increases, and/or when the conversion ratio is lower than a second conversion ratio threshold, the switching frequency decreases as the conversion ratio decreases; wherein the value of the output voltage is lower than the value of the input voltage; the conversion ratio is a quotient of the value of the output voltage divided by the value of the input voltage; and the first conversion ratio threshold is higher than the second conversion ratio threshold; wherein the switching frequency is inversely proportional to a total of the on-time and the off-time.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations among the process steps and the layers, while the shapes, thicknesses, and widths are not drawn in actual scale.

Figure 1:
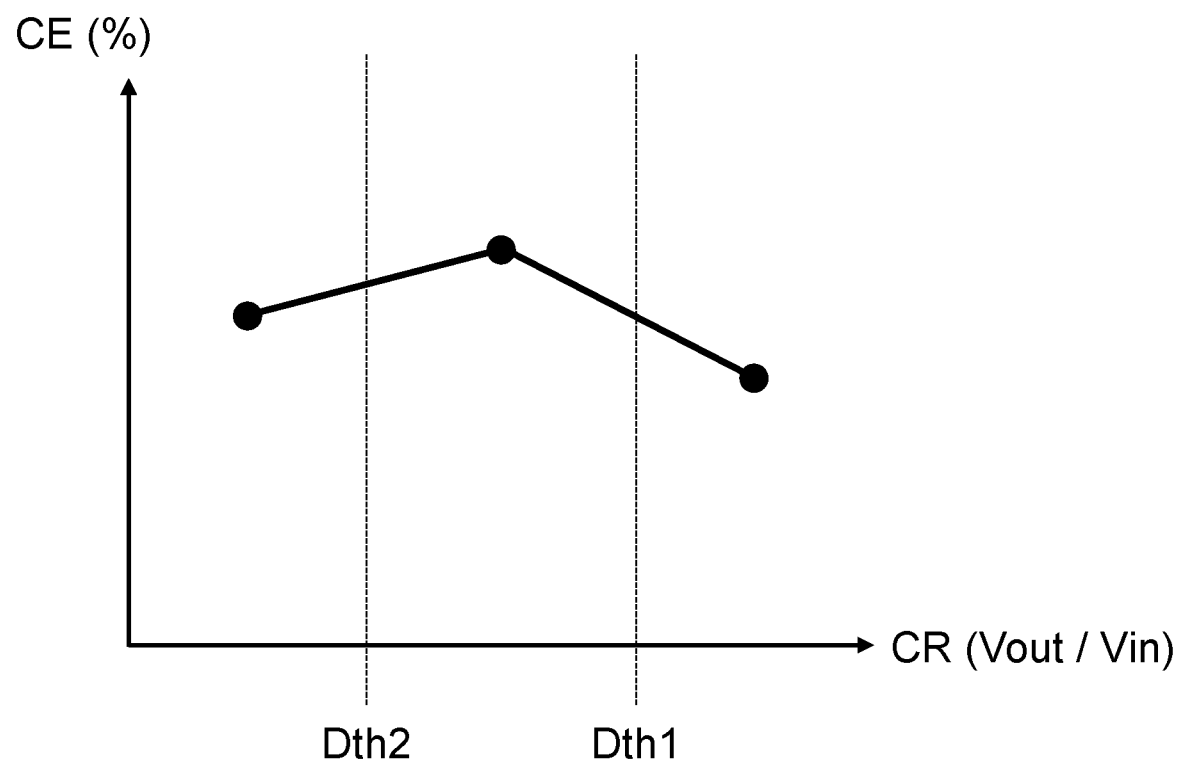
FIG. 1 shows a schematic diagram of conversion efficiency between an input power and an output power of a conventional switching power converter.
Figure 2A:
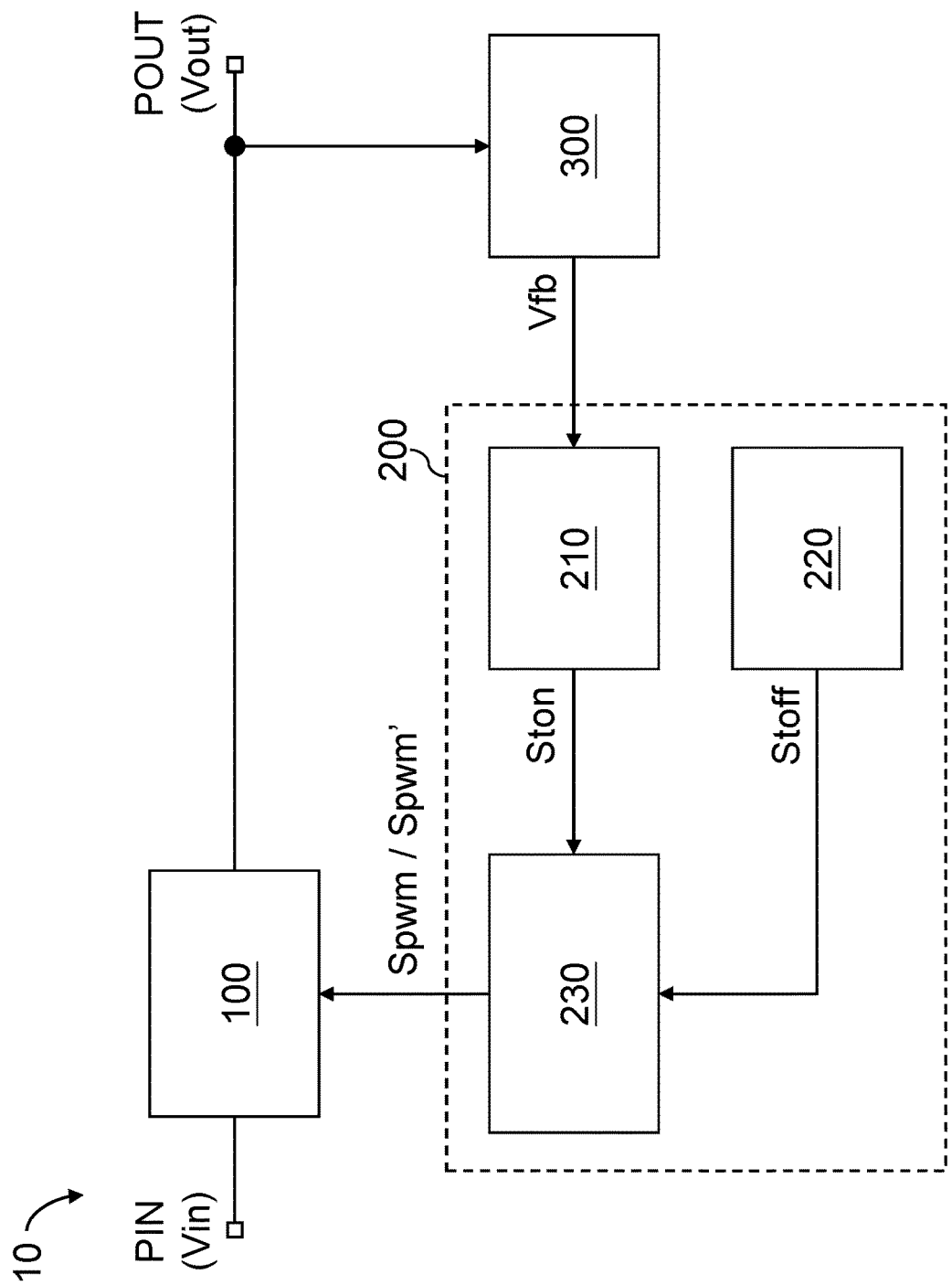
FIG. 2A shows a schematic block diagram of a switching power converter according to an embodiment of the present invention.
Figure 2B:
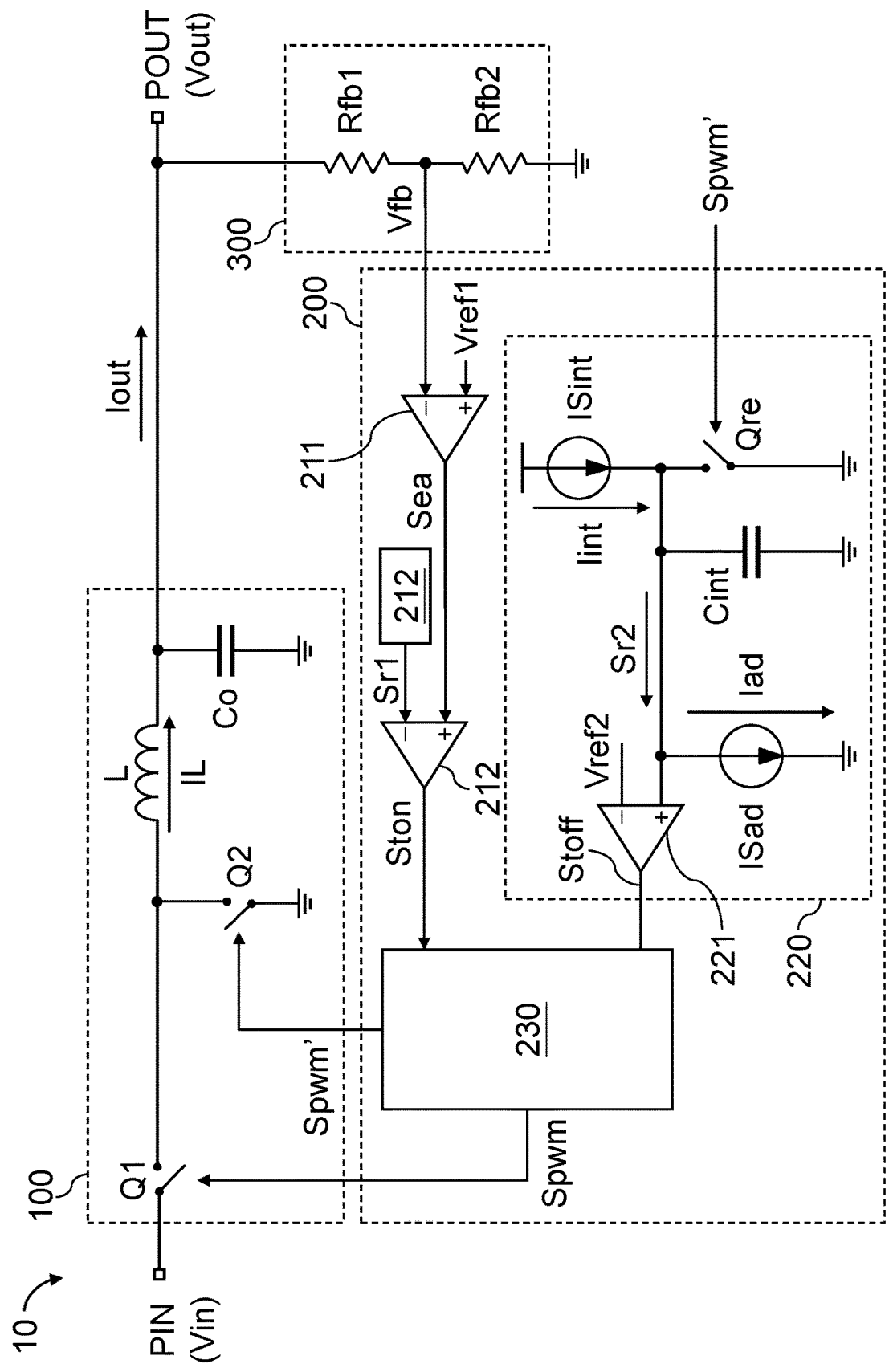
FIG. 2B shows a schematic circuit diagram of a switching power converter according to an embodiment of the present invention.
Figure 3:
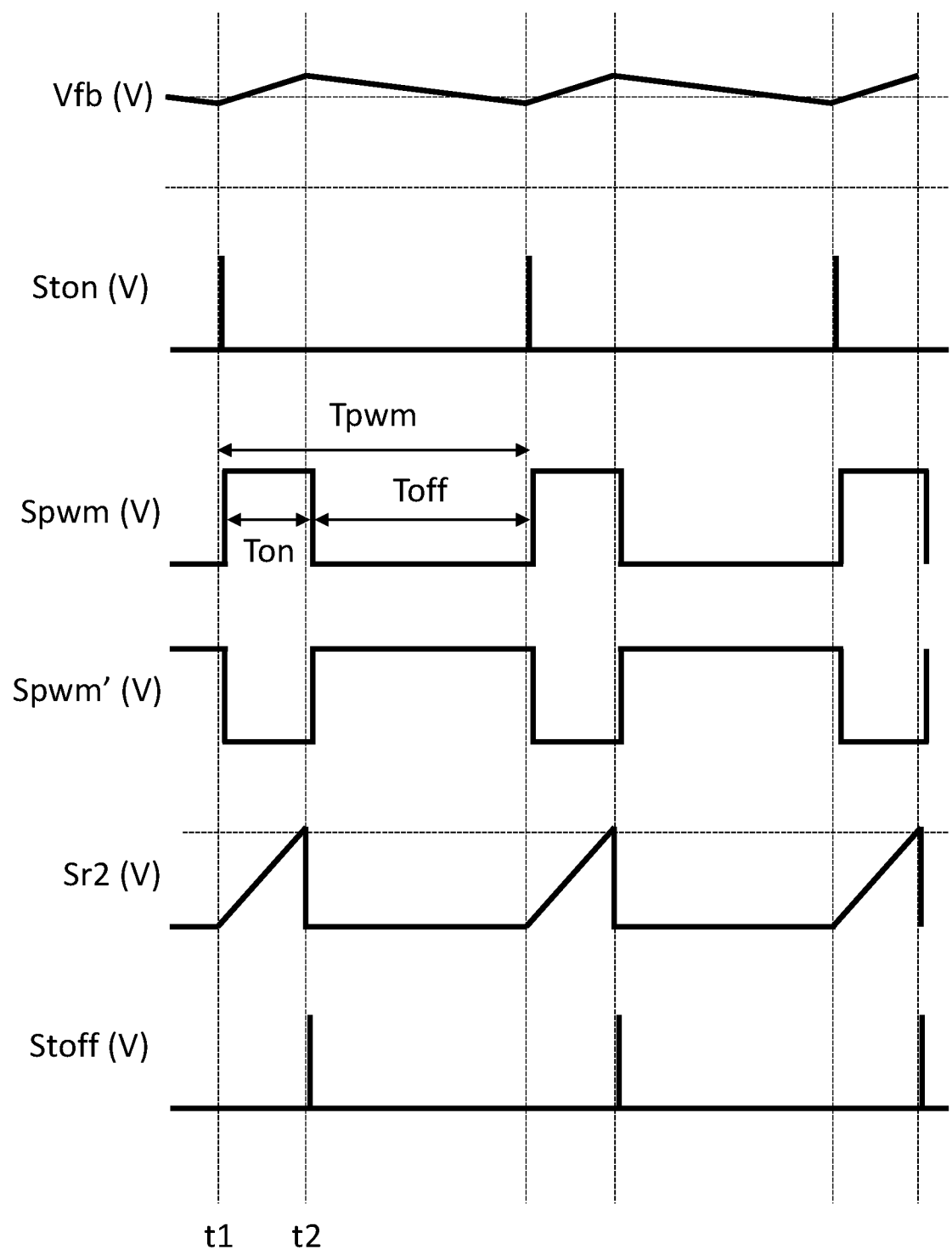
FIG. 3 shows a schematic diagram of signal waveforms of a switching power converter according to an embodiment of the present invention.

Please refer to FIG. 2A, FIG. 2B, and FIG. 3. FIG. 2A shows a schematic block diagram of a switching power converter 10 according to an embodiment of the present invention; FIG. 2B shows a schematic circuit diagram of the switching power converter 10; FIG. 3 shows a schematic diagram of signal waveforms of the switching power converter 10. As shown in FIG. 2A and FIG. 2B, the switching power converter 10 comprises a power stage circuit 100, a conversion control circuit 200, and a feedback circuit 300, wherein the conversion control circuit 200 includes a trigger signal generation circuit 210, an on-time control circuit 220, and a logic driver circuit 230. The structures and functions of the power stage circuit 100, the trigger signal generation circuit 210, the on-time control circuit 220, the logic driver circuit 230, and the feedback circuit 300 will be explained in detail below, along with the signal waveforms in FIG. 3 for illustrating the operations between each circuit.

Figure 4:
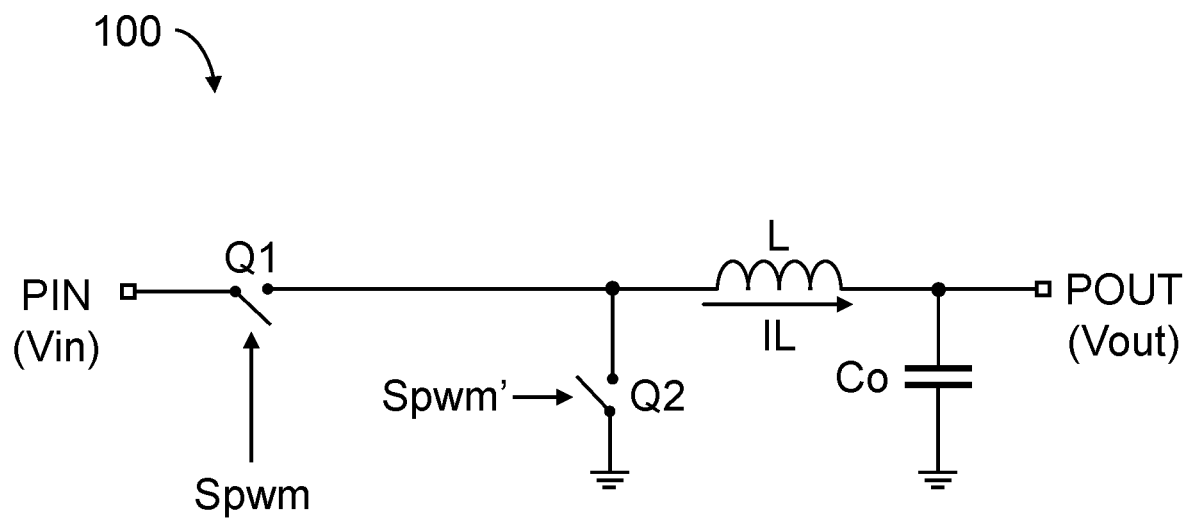
FIG. 4 shows a schematic circuit diagram of a power stage circuit according to an embodiment of the present invention.

Please refer to FIG. 4. FIG. 4 shows a schematic circuit diagram of the power stage circuit 100 according to an embodiment of the present invention. In some embodiments, the power stage circuit 100 is configured to convert an input power PIN to an output power POUT, wherein the input power PIN includes an input voltage Vin, and the output power POUT includes an output voltage Vout. As shown in FIG. 4, in some embodiments, the power stage circuit 100 includes plural switches and an inductor L. The two terminals of the switch Q1 are respectively coupled to the input power PIN and one terminal of the inductor L; the two terminals of the switch Q2 are respectively coupled to the one terminal of the inductor L and the ground; the other terminal of the inductor L is coupled to the output power POUT and an output capacitor Co. In some embodiments, the power stage circuit 100 is a buck converter. The structure and function of the buck converter are well known to the person having ordinary skills in the art, and thus will not be described in detail herein.

Figure 5:
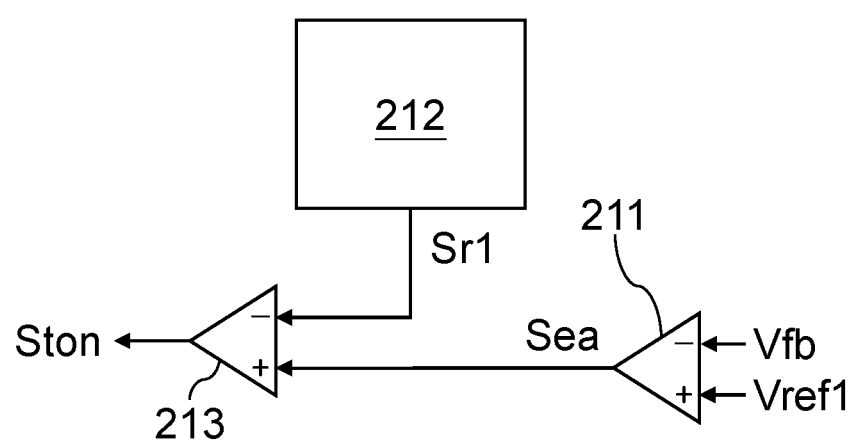
FIG. 5 shows a schematic circuit diagram of a trigger signal generation circuit according to an embodiment of the present invention.

Please refer to FIG. 5. FIG. 5 shows a schematic circuit diagram of the trigger signal generation circuit 210 according to an embodiment of the present invention. In some embodiments, the trigger signal generation circuit 210 is configured to generate a turn-on trigger signal Ston according to a feedback signal Vfb relevant to the output power POUT. As shown in FIG. 5, in some embodiments, the trigger signal generation circuit 210 includes an error amplifier circuit 211, a ramp signal generation circuit 212, and a first comparison circuit 213. The error amplifier circuit 211 is configured to amplify the difference between the feedback signal Vfb and a first reference voltage Vref1 to generate an error amplified signal Sea; the ramp signal generation circuit 212 is configured to generate a first ramp signal Sr1; the first comparison circuit 213 is configured to compare the first ramp signal Sr1 and the error amplified signal Sea to generate the turn-on trigger signal Ston. In some embodiments, the error amplifier circuit 211 is an error amplifier, and the first comparison circuit 213 is a comparator. The structures and functions of the error amplifier and the comparator are well known to the person having ordinary skills in the art, and thus will not be described in detail herein.

Figure 6:
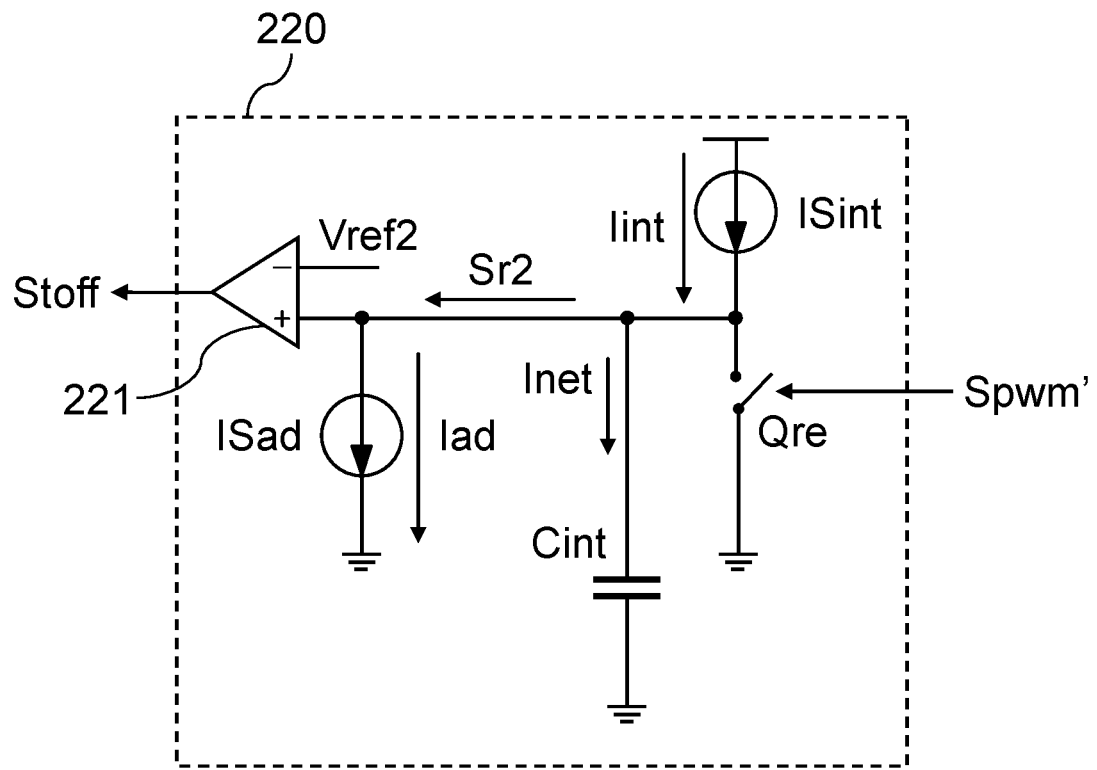
FIG. 6 shows a schematic circuit diagram of an on-time control circuit according to an embodiment of the present invention.

Please refer to FIG. 3 and FIG. 6. FIG. 6 shows a schematic circuit diagram of the on-time control circuit 220 according to an embodiment of the present invention. In some embodiments, the on-time control circuit 220 is configured to generate a turn-off trigger signal Stoff to determine an on-time Ton of a pulse width modulation (PWM) signal Spwm (as shown in FIG. 3), wherein the PWM signal Spwm is configured to control the plural switches of the power stage circuit 100, such that at least one of the plural switches (e.g., the switch Q1 in FIG. 4) is periodically turned on according to the on-time Ton. Specifically, in one embodiment, during the on-time Ton, the switch Q1 is controlled to be on and the switch Q2 is controlled to be off, and during the off-time Toff, the switch Q1 is controlled to be off and the switch Q2 is controlled to be on.

Please still refer to FIG. 3 and FIG. 6. In some embodiments, the on-time control circuit 220 includes an integration current source ISint, an integration capacitor Cint, a reset switch Qre, and a second comparison circuit 221. The two terminals of the integration capacitor Cint are respectively coupled to the integration current source ISint and the ground; the two terminals of the reset switch Qre are respectively coupled to the integration current source ISint and the ground. In some embodiments, the integration current source ISint is configured to generate an integration current Iint; the integration capacitor Cint is configured to generate a second ramp signal Sr2 according to the integration current Iint; the reset switch Qre is configured to reset the second ramp signal Sr2 when an inverted PWM signal Spwm' is enabled (as shown at the time point t2 in FIG. 3), wherein the inverted PWM signal Spwm' is an inverted signal of the PWM signal Spwm. That is, when the PWM signal Spwm is at high level, the inverted PWM signal Spwm' is at low level; when the PWM signal Spwm is at low level, the inverted PWM signal Spwm' is at high level. In some embodiments, the inverted PWM signal Spwm' is configured to control at least one of the switches of the power stage circuit 100 (e.g., the switch Q2 in FIG. 4).

In some embodiments, the second comparison circuit 221 is configured to compare the second ramp signal Sr2 and a second reference voltage Vref2 to generate the turn-off trigger signal Stoff, thereby determining the length of the on-time Ton. The switching period Tpwm of the PWM signal Spwm is the total of the on-time Ton and the off-time Toff, and the switching frequency Fs is the reciprocal of the switching period Tpwm. The on-time Ton is determined according to the capacitance of the integration capacitor Cint, the value of the second reference voltage Vref2 and a net integration current Inet, which will be described in detail later.

In some embodiments, in at least one range of the conversion ratio CR, the switching frequency Fs does not change along with the variation of the conversion ratio CR, that is, in at least one range of the conversion ratio CR, the switching frequency Fs is a constant value. In some embodiments, the value of the integration current Iint is proportional to the value of the input voltage Vin, and the value of the second reference voltage Vref2 is proportional to the value of the output voltage Vout, whereby the switching frequency Fs can be set to a constant value. Details of the above be described with reference to embodiments later.

As mentioned before, in order to improve the conversion efficiency CE when the value of the conversion ratio CR is higher than the first conversion ratio threshold Dth1 or lower than the second conversion ratio threshold Dth2, the switching power converter of the present invention can adaptively adjust the switching frequency of the switching power converter according to the conversion ratio CR, thereby improving the conversion efficiency.

Please still refer to FIG. 3 and FIG. 6. According to the present invention, in some embodiments, the on-time control circuit 220 further includes an adjusting current source ISad, which is coupled to the integration capacitor Cint. In some embodiments, the adjusting current source ISad is configured to adjust the length of the on-time Ton, wherein the level of the adjusting current Iad is determined by the input voltage Vin and the output voltage Vout. Accordingly, the switching frequency Fs can be adaptively adjusted according to the conversion ratio CR. In a preferred embodiment, when the value of the conversion ratio CR is higher than the first conversion ratio threshold Dth1, the switching frequency Fs decreases as the conversion ratio CR increases, and/or, when the value of the conversion ratio CR is lower than the second conversion ratio threshold Dth2, the switching frequency Fs decreases as the conversion ratio CR decreases, to improve the conversion efficiency when the conversion ratio CR is higher or lower. The details of the above will be described later.

It should be noted that the above embodiments use the control of the on-time Ton as examples. However, the same spirit of the present invention certainly can be applied to the control of the off-time Toff, which can be deduced by a person having ordinary skills in the art by analogy.

Figure 7:
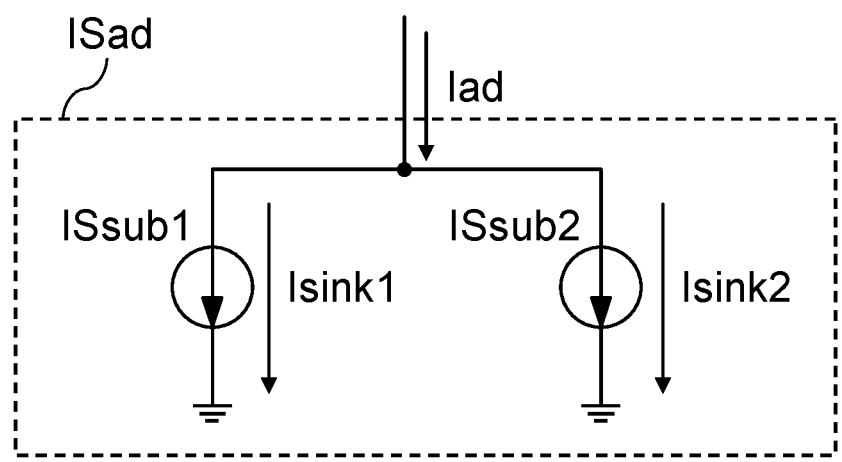
FIG. 7 shows a schematic circuit diagram of an adjusting current source according to an embodiment of the present invention.

Please refer to FIG. 7. FIG. 7 shows a schematic circuit diagram of an adjusting current source ISad according to a practical embodiment of the present invention. In some embodiments, the adjusting current source ISad includes a first sub-current source and/or a second sub-current source. Taking FIG. 7 as an example, in this embodiment, the adjusting current source ISad includes a first sub-current source ISsub1 and a second sub-current source ISsub2, wherein the first sub-current source ISsub1 and the second sub-current source ISsub2 are coupled in parallel. In some embodiments, the first sub-current source ISsub1 is configured to generate a first sub-current Isink1, and the second sub-current source ISsub2 is configured to generate a second sub-current Isink2; the adjusting current Iad includes the first sub-current Isink1 and the second sub-current Isink2. In some embodiments, the value of the adjusting current Iad is the value of the first sub-current Isink1 plus the value of the second sub-current Isink2. Specifically, the aforementioned net integration current Inet is the difference between the integration current Iint and the adjusting current Iad. Therefore, in some embodiments, when the adjusting current Iad increases (i.e., the first sub-current Isink1 and/or the second sub-current Isink2 increase), the net integration current Inet decreases, whereby the on-time Ton increase. It should be noted that, as the on-time Ton increases, the switching period Tpwm will increase when: the off-time Toff is a constant value; or when the off-time Toff also increases; or when the off-time Toff decrease and its decrease rate is lower than the increase rate of the on-time Ton. That is, the switching frequency Fs will decrease. The details of decreasing the switching frequency Fs by adjusting the on-time Ton and/or adjusting the off-time Toff will be described in detail later.

Figure 10A:
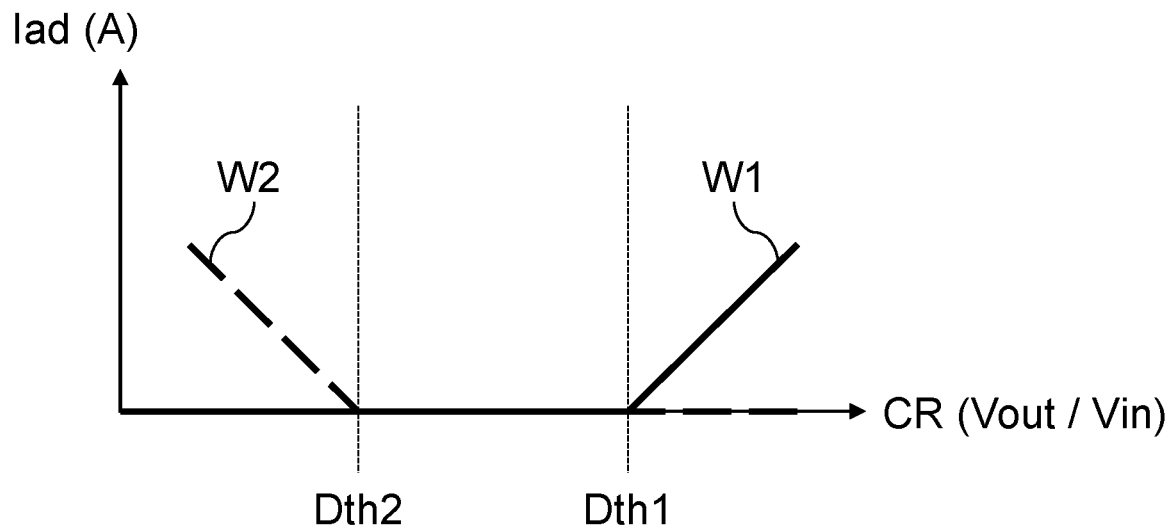
FIG. 10A shows a schematic diagram of current waveforms of an adjusting current according to an embodiment of the present invention.

Please also refer to FIG. 10A (FIG. 10A will be described in detail later). In one embodiment, when the conversion ratio CR is higher than the first conversion ratio threshold Dth1, the value of the first sub-current Isink1 is higher than 0; when the conversion ratio CR is lower than the first conversion ratio threshold Dth1, the value of the first sub-current Isink1 is 0. Accordingly, when the conversion ratio CR is higher than the first conversion ratio threshold Dth1, the aforementioned net integration current Inet decreases, such that the on-time Ton increases (as shown by the waveform W1). In one embodiment, when the conversion ratio CR is lower than the second conversion ratio threshold Dth2, the value of the second sub-current Isink2 is higher than 0; when the conversion ratio CR is higher than the second conversion ratio threshold Dth2, the value of the second sub-current Isink2 is 0. Accordingly, when the conversion ratio CR is lower than the second conversion ratio threshold Dth2, the aforementioned net integration current Inet decreases, such that the on-time Ton increases (as shown by the waveform W2).

Figure 8:
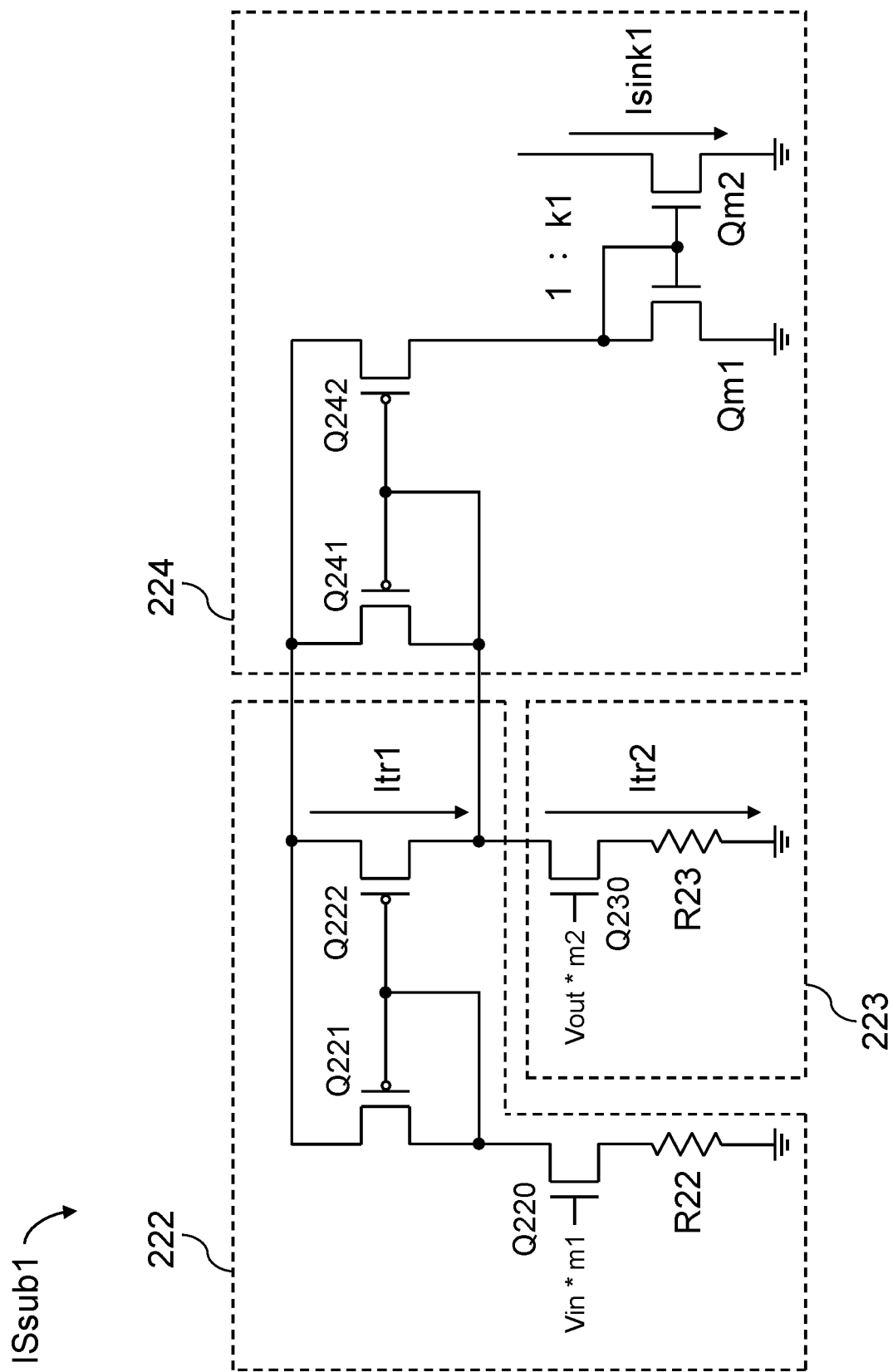
FIG. 8 shows a schematic circuit diagram of a first sub-current source according to an embodiment of the present invention.

Please refer to FIG. 8. FIG. 8 shows a schematic circuit diagram of a first sub-current source ISsub1 according to a practical embodiment of the present invention. As shown in FIG. 8, in some embodiments, the first sub-current source ISsub1 includes a first transconductance circuit 222, a second transconductance circuit 223, and a first mirror circuit 224.

In some embodiments, the first transconductance circuit 222 is configured to generate a first transconductance current Itr1 according to the input voltage Vin; the second transconductance circuit 223 is configured to generate a second transconductance current Itr2 according to the output voltage Vout; and the first mirror circuit 224 is configured to generate the first sub-current Isink1 by mirroring the difference between the second transconductance current Itr2 and the first transconductance current Itr1, wherein when the value of the second transconductance current Itr2 is higher than the value of the first transconductance current Itr1, the value of the first sub-current Isink1 is proportional to the difference between the second transconductance current Itr2 and the first transconductance current Itr1; and when the value of the second transconductance current Itr2 is lower than the value of the first transconductance current Itr1, the value of the first sub-current Isink1 is 0.

Please still refer to FIG. 8, in some embodiments, the first transconductance circuit 222 includes a transistor Q220, a transistor Q221, a transistor Q222, and a resistor R22 (having a resistance R1), wherein the transistor Q220 and the resistor R22 are configured as a source follower circuit to generate a transconductance current through the transistor Q220 according to the input voltage Vin. The transistor Q221 and the transistor Q222 are configured as a mirror circuit, to mirror the transconductance current to generate the first transconductance current Itr1. Specifically, the relationship between the first transconductance current Itr1 and the input voltage Vin is shown as follows:

$$Itr1=(Vin*m1-VGS220)/R1 \quad \text{Formula 1-1:}$$

wherein VGS220 is the gate-source voltage of the transistor Q220, and m1 is a positive real number, wherein m1/R1 can be regarded as a first predetermined transconductance value of converting the input voltage Vin to the first transconductance current Itr1.

In some embodiments, the second transconductance circuit 223 includes a transistor Q230 and a resistor R23 (having a resistance R1), wherein the transistor Q230 and the resistor R23 are configured as a source follower circuit to generate the transconductance current Itr2 through the transistor Q230 according to the output voltage Vout. Specifically, the relationship between the second transconductance current Itr2 and the output voltage Vout is shown as follows:

$$Itr2=(Vout*m2-VGS230)/R1 \quad \text{Formula 1-2:}$$

wherein VGS230 is the gate-source voltage of the transistor Q230, and m2 is a positive real number, wherein m2/R1 can be regarded as a second predetermined transconductance value of converting the output voltage Vout to the second transconductance current Itr2.

In some embodiments, the first mirror circuit 224 includes a transistor Q241, a transistor Q242, a transistor Qm1, and a transistor Qm2, wherein the transistor Q242 is configured as diode-coupled to receive the difference between the second transconductance current Itr2 and the first transconductance current Itr1, and generate the first sub-current Isink1 by mirroring the difference by the transistor Q242, the transistor Qm1, and the transistor Qm2.

In some embodiments, when the physical dimensions of the transistor Q220 and the transistor Q230 are appropriately configured, the gate-source voltage VGS230 is close to the gate-source voltage VGS220. Accordingly, in obtaining the difference between the second transconductance current Itr2 and the first transconductance current Itr1, the components of the gate-source voltage VGS230 and the gate-source voltage VGS220 will cancel each other. In other words, the relationship between the first sub-current Isink1, the output voltage Vout, and the input voltage Vin can be shown as follows:

$$Isink1=k1*(Itr2-Itr1)=k1*(Vout*m2-Vin*m1)/R1 \quad \text{Formula 1-3:}$$

wherein k1 is a positive real number.

It should be noted that, since the transistor Q241 is configured as diode-coupled, when the second transconductance current Itr2 is higher than the first transconductance current Itr1, the value of the first sub-current Isink1 will conform the relationship of formula 1-3; on the other hand, when the second transconductance current Itr2 is lower than the first transconductance current Itr1, the value of the first sub-current Isink1 will be 0.

Figure 9:
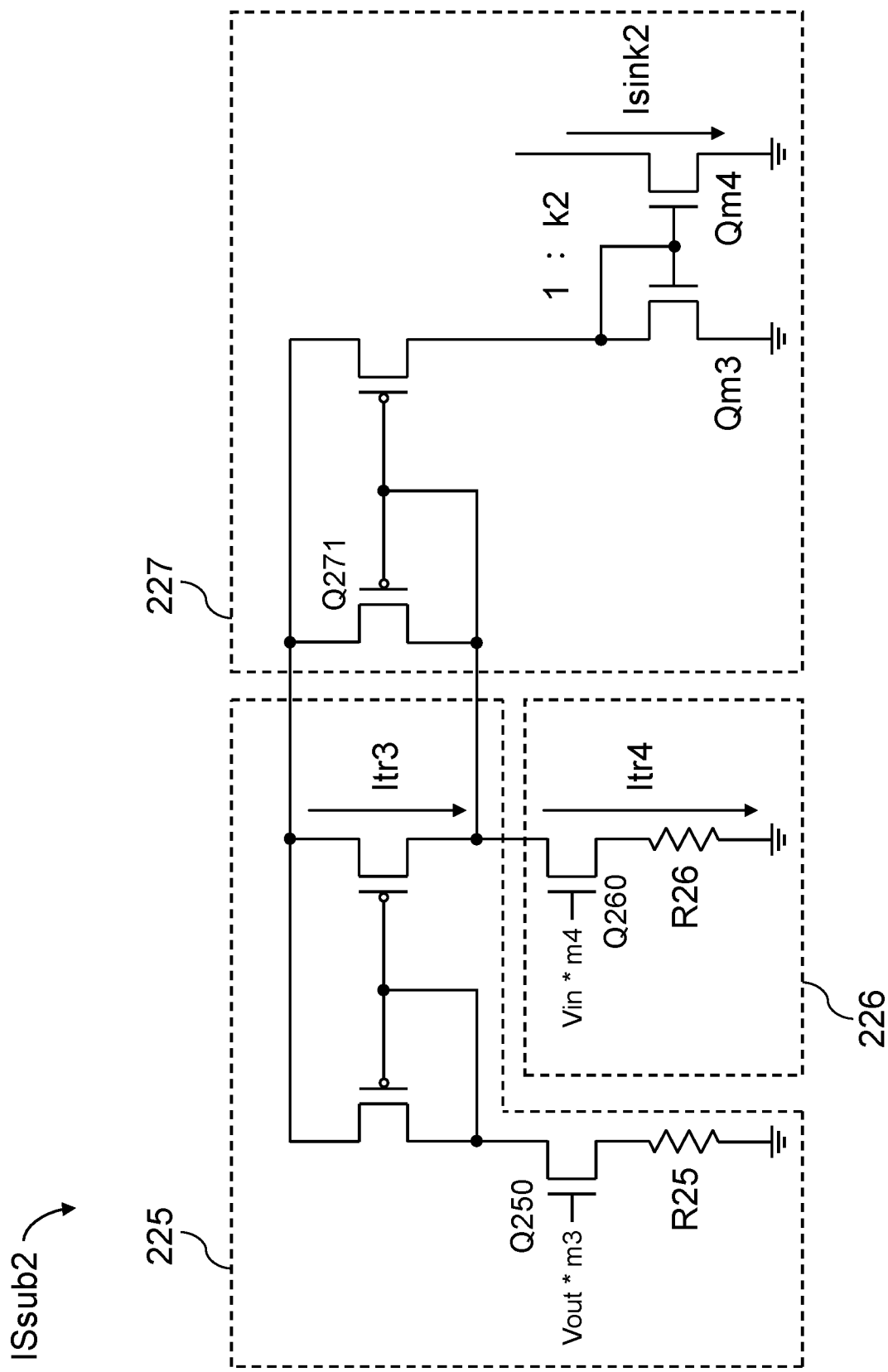
FIG. 9 shows a schematic circuit diagram of a second sub-current source according to an embodiment of the present invention.

Please refer to FIG. 9. FIG. 9 shows a schematic circuit diagram of a second sub-current source ISsub2 according to a practical embodiment of the present invention. As shown in FIG. 9, in some embodiments, the second sub-current source ISsub2 includes a third transconductance circuit 225, a fourth transconductance circuit 226, and a second mirror circuit 227.

In some embodiments, the third transconductance circuit 225 is configured to generate a third transconductance current Itr3 according to the output voltage Vout; the fourth transconductance circuit 226 is configured to generate a fourth transconductance current Itr4 according to the input voltage Vin; and the second mirror circuit 227 is configured to generate the second sub-current Isink2 by mirroring the difference between the fourth transconductance current Itr4 and the third transconductance current Itr3, wherein when the value of the fourth transconductance current Itr4 is higher than the value of the third transconductance current Itr3, the value of the second sub-current Isink2 is proportional to the difference between the fourth transconductance current Itr4 and the third transconductance current Itr3; and when the value of the fourth transconductance current Itr4 is lower than the value of the third transconductance current Itr3, the value of the second sub-current Isink2 is 0.

The operations of the third transconductance circuit 225, the fourth transconductance circuit 226, and the second mirror circuit 227 shown in FIG. 9 are similar to the first transconductance circuit 222, the second transconductance circuit 223, and the first mirror circuit 224, respectively. Therefore, the following formula of the third transconductance current Itr3, the fourth transconductance current Itr4, and the second sub-current Isink2 can be obtained similarly:

$$Itr3=(Vout*m3-VGS250)/R1 \quad \text{Formula 2-1:}$$

$$Itr4=(Vin*m4-VGS260)/R1 \quad \text{Formula 2-2:}$$

$$Isink2=k2*(Itr4-Itr3)=(Vin*m4-Vout*m3)/R1 \quad \text{Formula 2-3:}$$

wherein VGS250 is the gate-source voltage of the transistor Q250; m3 is a positive real number; VGS260 is the gate-source voltage of the transistor Q260; m4 is a positive real number; and k2 is a positive real number, wherein the gate-source voltage VGS250 is close to the gate-source voltage VGS260. m3/R1 can be regarded as a third predetermined transconductance value of converting the output voltage Vout to the third transconductance current Itr3, and m4/R1 can be regarded as a fourth predetermined transconductance value of converting the input voltage Vin to the fourth transconductance current Itr4.

Since the transistor Q271 is configured as diode-coupled, when the fourth transconductance current Itr4 is higher than the third transconductance current Itr3, the value of the second sub-current Isink2 will conform the relationship of formula 2-3; on the other hand, when the fourth transconductance current Itr4 is lower than the third transconductance current Itr3, the value of the second sub-current Isink2 will be 0.

It should be noted that, in some embodiments, the first conversion ratio threshold Dth1 corresponds to the value of the conversion ratio CR when the value of the first sub-current Isink1 turns to 0, and the second conversion ratio threshold Dth2 corresponds to the value of the conversion ratio CR when the value of the second sub-current Isink2 turns to 0. In other words, the first conversion ratio threshold Dth1 corresponds to the value of the conversion ratio CR when the second transconductance current Itr2 is equal to the first transconductance current Itr1, and the second conversion ratio threshold Dth2 corresponds to the value of the conversion ratio CR when the fourth transconductance current Itr4 is equal to the third transconductance current Itr3.

Please further refer to FIG. 10A. FIG. 10A shows a schematic diagram of current waveforms of an adjusting current Iad according to an embodiment of the present invention (corresponding to the embodiments in FIG. 8 and FIG. 9), wherein the waveform W1 is the waveform of the first sub-current Isink1, and the waveform W2 is the waveform of the second sub-current Isink2, and the horizontal axis of FIG. 10A is the conversion ratio CR. As shown in FIG. 10A, when the conversion ratio CR is higher than the first conversion ratio threshold Dth1, the value of the first sub-current Isink1 is higher than 0 (as shown by the waveform W1), and according to the relationship of formula 1-3, the value of the first sub-current Isink1 increases as the conversion ratio CR increases; when the conversion ratio CR is lower than the second conversion ratio threshold Dth2, the value of the second sub-current Isink2 is higher than 0 (as shown by the waveform W2), and according to the relationship of formula 2-3, the value of the second sub-current Isink2 increases as the conversion ratio CR decreases.

From one perspective, in some embodiments, the first conversion ratio threshold Dth1 can be obtained from formula 1-3 by the ratio between the output voltage Vout and the input voltage Vin (corresponding to the value of the conversion ratio CR) when the first sub-current Isink1 is 0. Specifically, let the first sub-current Isink1 be 0 in formula 1-3, the following can be obtained:

$$(Vout*m2-Vin*m1)/R1=0 \quad \text{Formula 3-1:}$$

$$Dth1=Vout/Vin=m1/m2 \quad \text{Formula 3-2:}$$

In other words, in some embodiments, the first conversion ratio threshold Dth1 is relevant to the ratio between the transconductance value of the first transconductance circuit 222 and the transconductance value of the second transconductance circuit 223.

Similarly, in some embodiments, the second conversion ratio threshold Dth2 can be obtained from formula 2-3 by the ratio between the output voltage Vout and the input voltage Vin (corresponding to the value of the conversion ratio CR) when the second sub-current Isink2 is 0. Specifically, let the second sub-current Isink2 be 0 in formula 2-3, the following can be obtained:

$$(Vin*m4-Vout*m3)/R1=0 \quad \text{Formula 3-3:}$$

$$Dth2=Vout/Vin=m4/m3 \quad \text{Formula 3-4:}$$

In other words, in some embodiments, the second conversion ratio threshold Dth2 is relevant to the ratio between the transconductance value of the fourth transconductance circuit 226 and the transconductance value of the third transconductance circuit 225.

Figure 10B:
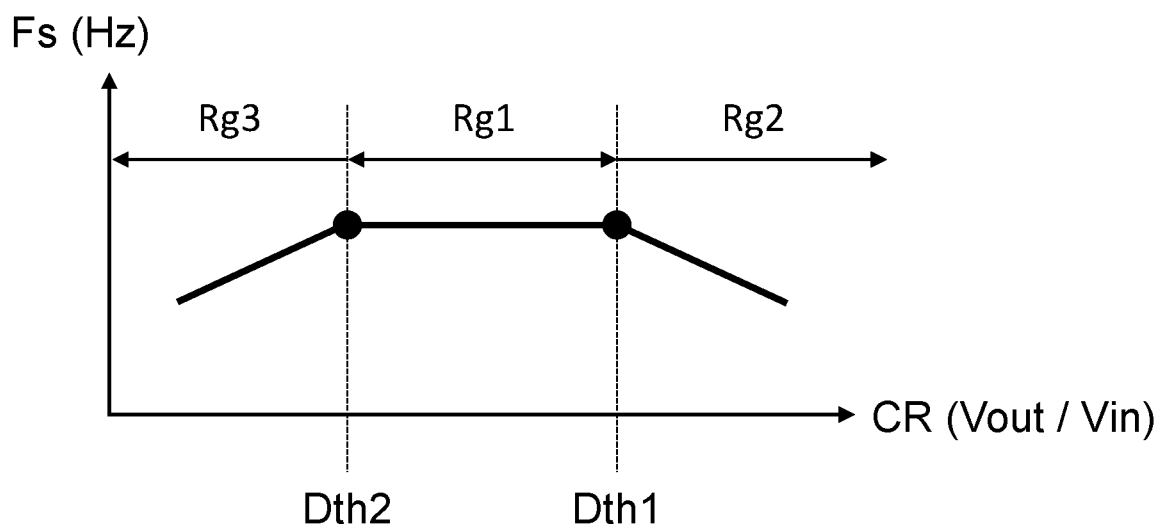
FIG. 10B shows a schematic diagram of a frequency waveform of the switching frequency of a pulse width modulation (PWM) signal according to an embodiment of the present invention.

Please refer to FIG. 10B. FIG. 10B shows a schematic diagram of a frequency waveform of the switching frequency Fs of a PWM signal Spwm according to an embodiment of the present invention, wherein the horizontal axis of FIG. 10B is the conversion ratio CR, and the vertical axis of FIG. 10B is the switching frequency Fs of the PWM signal Spwm. In some embodiments, the on-time control circuit 220 determines the conversion ratio CR according to the input voltage Vin and the output voltage Vout, and determines the value of the adjusting current Iad according to the variation of the conversion ratio CR, thereby adjusting the length of the on-time Ton and/or the length of the off-time Toff to adjust the value of the switching frequency. As shown in FIG. 10A and FIG. 10B, when the conversion ratio CR is higher than the first conversion ratio threshold Dth1, the adjusting current Iad adjusts the switching frequency Fs by the first sub-current Isink1, such that the switching frequency Fs decreases as the conversion ratio CR increases; when the conversion ratio CR is lower than the second conversion ratio threshold Dth2, the adjusting current Iad adjusts the switching frequency Fs by the second sub-current Isink2, such that the switching frequency Fs decreases as the conversion ratio decreases.

Figure 11A:
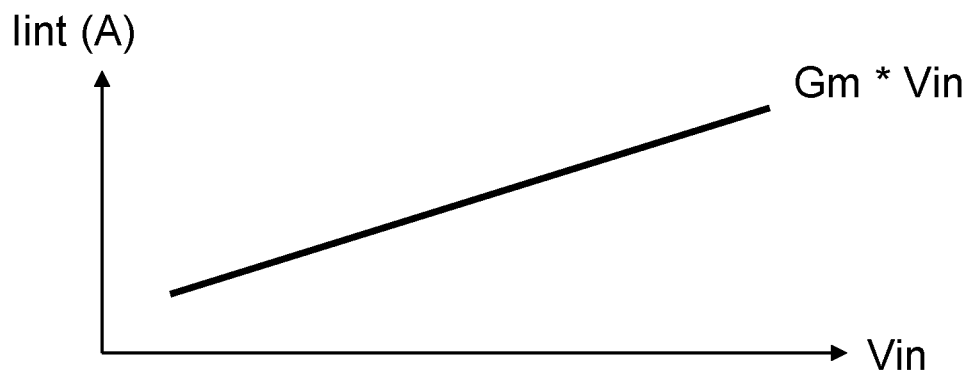
FIG. 11A shows a schematic diagram of a current waveform of an integration current according to an embodiment of the present invention.
Figure 11B:
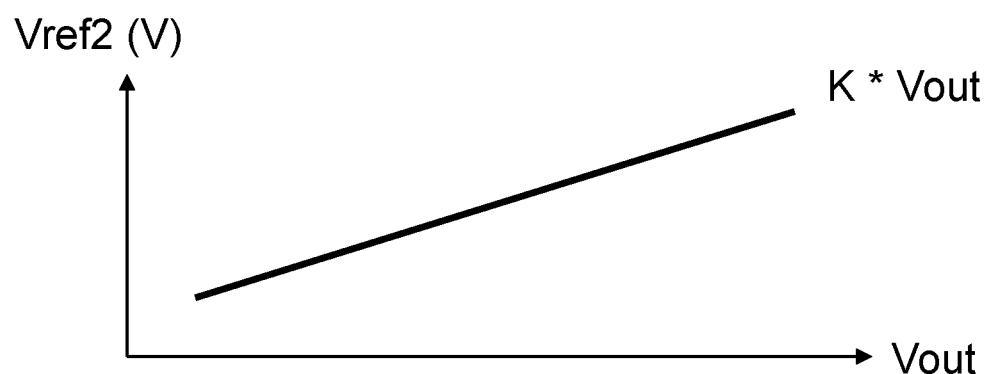
FIG. 11B shows a schematic diagram of a voltage waveform of a second reference voltage according to an embodiment of the present invention.

Please refer to FIG. 10B, FIG. 11A, and FIG. 11B. FIG. 11A shows a schematic diagram of a characteristic curve of the integration current Iint corresponding to the input voltage according to an embodiment of the present invention; FIG. 11B shows a schematic diagram of a characteristic curve of the second reference voltage Vref2 corresponding to the output voltage Vout according to an embodiment of the present invention. In some embodiments, the integration current Iint is proportional to the input voltage Vin, and the second reference voltage Vref2 is proportional to the output voltage Vout. Accordingly, in the region wherein the adjusting current Iad is 0 (e.g., the conversion ratio CR between the first conversion ratio threshold Dth1 and the second conversion ratio threshold Dth2), the switching frequency Fs is a constant value. Taking FIG. 11A as an example, in this embodiment, the value of the integration current Iint is the value of the input voltage Vin multiplied by a transconductance value Gm, wherein the transconductance value Gm is a constant value. Taking FIG. 11B as an example, in this embodiment, the value of the second reference voltage Vref2 is the value of the output voltage Vout multiplied by a constant value K.

In some embodiments, the first conversion ratio threshold Dth1 is higher than the second conversion ratio threshold Dth2. In some embodiments, when the conversion ratio CR is lower than the first conversion ratio threshold Dth1 and higher than the second conversion ratio threshold Dth2 (i.e., in the region wherein the adjusting current Iad is 0), and when the integration current Iint is proportional to the input voltage Vin and the second reference voltage Vref2 is proportional to the output voltage Vout, the switching period Tpwm is a constant value, such that the switching frequency Fs is a constant value. Please refer to formula 4 and formula 5. Formula 4 is the formula of calculating the on-time Ton of the PWM signal Spwm, and formula 5 is the formula of calculating the switching frequency Fs of the PWM signal Spwm. Since the conversion ratio CR is lower than the first conversion ration threshold Dth1 and higher than the second conversion ratio threshold Dth2, the value of the adjusting current Iad is 0. Therefore, the item of the adjusting current Iad does not exist in formula 4. In some embodiments, formula 5 can be derived by substituting the formula of the integration current Iint (as shown in FIG. 11A) and the formula of the second reference voltage Vref2 (as shown in FIG. 11B) into formula 4. Since the parameters in formula 5 are all constant values, the switching period Tpwm calculated according to formula 5 is a constant value, and the switching frequency Fs is also a constant value (as shown in the region Rg1 of FIG. 10B).

$$Ton=Cint*Vref2/Iint=Tpwm*CR \qquad \text{Formula 4:}$$

$$Fs=1/Tpwm=Gm/(Cint*K) \qquad \text{Formula 5:}$$

Please refer to formula 6 and formula 7. Formula 6 is the formula of calculating the on-time Ton of the PWM signal Spwm, and formula 7 is the formula of calculating the switching frequency Fs of the PWM signal Spwm. Since the conversion ratio CR is higher than the first conversion ration threshold Dth1 or lower than the second conversion ratio threshold Dth2, the value of the adjusting current Iad is not 0. Therefore, the item of the adjusting current Iad exists in formula 6. In some embodiments, formula 7 can be derived by formula 6, wherein the value of the switching frequency Fs is dependent on the conversion ratio CR and the adjusting current Iad. When the conversion ratio CR is higher than the first conversion ration threshold Dth1 or lower than the second conversion ratio threshold Dth2, the value of the adjusting current Iad increases, such that the value of the switching frequency Fs decreases (as shown in the region Rg2, Rg3 of FIG. 10B).

$$Ton=Cint*Vref2/(Iint-Iad)=Tpwm*CR \qquad \text{Formula 6:}$$

$$Fs=1/Tpwm=(Iint-Iad)*CR/(Cint*Vref2) \qquad \text{Formula 7:}$$

In some embodiments, the value of the adjusting current Iad is adjusted in the ways as explained with reference to the embodiments of FIG. 8 and FIG. 9. In these embodiments, the length of the on-time Ton is extended by adjusting the first sub-current Isink1 and/or the second sub-current Isink2. It should be noted that, in some embodiments, the relationship between the aforementioned parameters (e.g., Gm, K, m1, m2, m3, m4, k1, k2, R1) also can determine the off-time Toff to vary along with the variation of the conversion ratio CR. In some embodiments, the length of the on-time Ton is extended by adjusting the first sub current Isink1 and/or the second sub-current Isink2, while the off-time Toff is not changed along with the conversion ratio. That is, in these embodiments, the off-time Toff is kept at a constant value, but the length of the on-time Ton increases to increase the switching period Tpwm, that is, to decrease the switching frequency Fs. In some other embodiments, the length of the off-time Toff can be extended in a similar way.

In some embodiments, the adjusting current Iad can include only the first sub-current Isink1, that is, the switching frequency is adjusted only when the conversion ratio CR is higher than the first conversion ratio threshold Dth1; while in some other embodiments, the adjusting current Iad can include only the second sub-current Isink2, that is, the switching frequency is adjusted only when the conversion ratio CR is lower than the second conversion ratio threshold Dth2.

More specifically, in some embodiments, when the length of the on-time Ton is extended by adjusting the first sub-current Isink1 and/or the second sub-current Isink2, for example by the methods of the embodiments of FIG. 8 and FIG. 9, the off-time Toff is also adjusted to increase along with the variation of the conversion ratio CR at the same time. Or in some different embodiments, the off-time Toff decreases along with the variation of the conversion ratio CR, but the decrease rate of the off-time Toff is smaller than the increase rate of the on-time Ton, so that the switching period Tpwm still increases, and the switching frequency Fs decreases. Various possible combinations are shown below by table 1 and table 2.

Please refer to table 1, table 1 is a truth table, wherein the differential value of the on-time Ton to the conversion ratio CR (dTon/dCR) and the differential value of the off-time Toff to the conversion ratio CR (dToff/dCR) are variables, under the condition wherein the conversion ratio CR is higher than the first conversion ratio threshold Dth1. In the truth table, "true" indicates that the corresponding variable combination can make the switching period Tpwm increase as the conversion ratio CR increases, that is, to make the switching frequency Fs decrease as the conversion ratio CR increases.

TABLE 1

|  | dTon/dCR > 0 | dTon/dCR < 0 | dTon/dCR = 0 |
|---|---|---|---|
| dToff/dCR > 0 | always true: relationship 1 | dToff/dCR > \|dTon/dCR\|: relationship 3-1 | always true: relationship 2-1 |
| dToff/dCR < 0 | dTon/dCR > \|dToff/dCR\|: relationship 3-2 | false | false |
| dToff/dCR = 0 | always true: relationship 2-2 | false | false |

In table 1, relationship 1 is when the differential value of the on-time Ton to the conversion ratio CR and the differential value of the off-time Toff to the conversion ratio CR are both higher than 0; in this case the switching frequency Fs decreases as the conversion ratio CR increases. Relationship 2 (including relationship 2-1 and relationship 2-2) is when one of the differential value of the on-time Ton to the conversion ratio CR and the differential value of the off-time Toff to the conversion ratio CR is 0 and the other is higher than 0; in this case the switching frequency Fs decreases as the conversion ratio CR increases. Relationship 3 (including relationship 3-1 and relationship 3-2) is when one of the differential value of the on-time Ton to the conversion ratio CR and the differential value of the off-time Toff to the conversion ratio CR is positive and the other is negative, wherein the differential value with a positive value is higher than the absolute value of the differential value with a negative value; in this case the switching frequency Fs decreases as the conversion ratio CR increases.

In some embodiments, when the conversion ratio CR is higher than the first conversion ratio threshold Dth1, the first sub-current source ISsub1 of the adjusting current source ISad determines the value of the first sub-current Isink1 of the adjusting current Iad according to the first predetermined transconductance value m1/R1 corresponding to the input voltage Vin and the second predetermined transconductance value m2/R1 corresponding to the output voltage Vout (as shown in FIG. 8), thereby adjusting the on-time Ton and/or the off-time Toff to satisfy one of relationship 1 to relationship 3 of table 1, such that the switching frequency Fs decreases as the conversion ratio CR increases. From one perspective, the first predetermined transconductance value m1/R1 and the second predetermined transconductance value m2/R1 should be set in such a way that the differential value of the on-time Ton to the conversion ratio CR and the differential value of the off-time Toff to the conversion ratio CR can satisfy one of relationship 1 to relationship 3 in table 1, to make sure that when the conversion ratio CR is higher than the first conversion ratio threshold Dth1, the switching frequency Fs decreases as the conversion ratio CR increases.

In some embodiments, when the conversion ratio CR is higher than the first conversion ratio threshold Dth1, and the aforementioned parameters are set as follows: K=1/4, Gm=1/(8*R1), m2=1/4, m1=1/8, k1=1, such configuration can correspond to the relationship 2-2 in table 1, that is, the differential value of the on-time Ton to the conversion ratio CR (dTon/dCR) is higher than 0, and the differential value of the off-time Toff to the conversion ratio CR (dToff/dCR) is equal to 0, such that the switching frequency Fs decreases as the conversion ratio CR increases.

Please refer to table 2, table 2 is a truth table, wherein the differential value of the on-time Ton to the conversion ratio CR (dTon/dCR) and the differential value of the off-time Toff to the conversion ratio CR (dToff/dCR) are variables, under the condition wherein the conversion ratio CR is lower than the second conversion ratio threshold Dth2. In the truth table, "true" indicates that the corresponding variable combination can make the switching period Tpwm increase as the conversion ratio CR increases, that is, to make the switching frequency Fs decrease as the conversion ratio CR increases.

In table 2, relationship 4 is when the differential value of the on-time Ton to the conversion ratio CR and the differential value of the off-time Toff to the conversion ratio CR are both lower than 0; in this case the switching frequency Fs decreases as the conversion ratio CR decreases. Relationship 5 (including relationship 5-1 and relationship 5-2) is when one of the differential value of the on-time Ton to the conversion ratio CR and the differential value of the off-time Toff to the conversion ratio CR is 0 and the other is lower than 0; in this case the switching frequency Fs decreases as the conversion ratio CR decreases. Relationship 6 (including relationship 6-1 and relationship 6-2) is when one of the differential value of the on-time Ton to the conversion ratio CR and the differential value of the off-time Toff to the conversion ratio CR is positive and the other is negative, wherein the absolute value of the differential value with a negative value is higher than the differential value with a positive value; in this case the switching frequency Fs decreases as the conversion ratio CR decreases.

In some embodiments, when the conversion ratio CR is lower than the second conversion ratio threshold Dth2, the second sub-current source ISsub2 of the adjusting current source ISad determines the value of the second sub-current Isink2 of the adjusting current Iad according to the third predetermined transconductance value m3/R1 corresponding to the output voltage Vin and the fourth predetermined transconductance value m4/R1 corresponding to the input voltage Vin (as shown in FIG. 9), thereby adjusting the on-time Ton and/or the off-time Toff to satisfy one of relationship 4 to relationship 6 of table 2, such that the switching frequency Fs decreases as the conversion ratio CR decreases. From one perspective, the third predetermined transconductance value m3/R1 and the fourth predetermined transconductance value m4/R1 should be set in such a way that the differential value of the on-time Ton to the conversion ratio CR and the differential value of the off-time Toff to the conversion ratio CR satisfy one of relationship 4 to relationship 6 in table 2, to make sure when the conversion ratio CR is lower than the second conversion ratio threshold Dth2, the switching frequency Fs decreases as the conversion ratio CR decreases.

In some embodiments, when the conversion ratio CR is lower than the second conversion ratio threshold Dth2, and the aforementioned parameters are set as follows: K=1/4, Gm=1/(8*R1), m4=1/8, m3=1, k2=3, such configuration can correspond to the relationship 5-2 in table 2, that is, the differential value of the on-time Ton to the conversion ratio CR (dTon/dCR) is lower than 0, and the differential value of the off-time Toff to the conversion ratio CR (dToff/dCR) is equal to 0, such that the switching frequency Fs decreases as the conversion ratio CR decreases.

In some embodiments, the logic driver circuit 230 is configured to generate the PWM signal Spwm according to the turn-on trigger signal Ston and the turn-off trigger signal Stoff, wherein the turn-on trigger signal Ston is configured to enable the PWM signal Spwm (as shown at the time point t1 in FIG. 3), the turn-off trigger signal Stoff is configured to disable the PWM signal Spwm (as shown at the time point t2 in FIG. 3). Taking FIG. 4 as an example, in this embodiment, the PWM signal Spwm is configured to control the switch Q1, and the inverted PWM signal Spwm' is configured to control the switch Q2.

Figure 12:
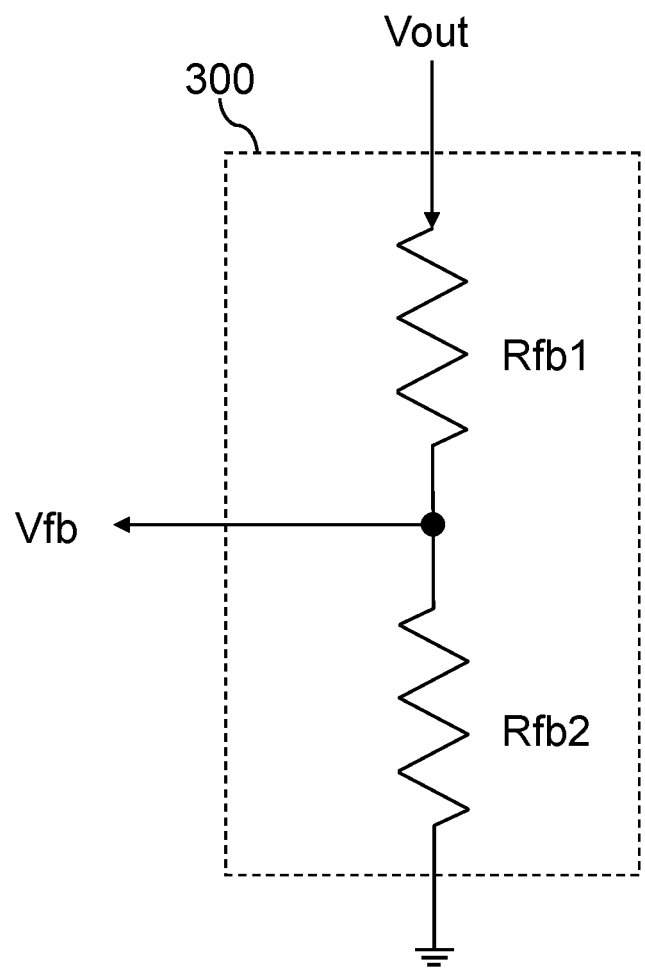
FIG. 12 shows a schematic circuit diagram of a feedback circuit according to an embodiment of the present invention.

Please refer to FIG. 12. FIG. 12 shows a schematic circuit diagram of a feedback circuit 300 according to an embodiment of the present invention. In some embodiments, the feedback circuit 300 is configured to generate the feedback signal Vfb according to the output voltage Vout of the output

TABLE 2

|   | dTon/dCR > 0 | dTon/dCR < 0 | dTon/dCR = 0 |
|---|---|---|---|
| dToff/dCR > 0 | false | \|dTon/dCR\| > dToff/dCR: relationship 6-1 | false |
| dToff/dCR < 0 | \|dToff/dCR\| > dTon/dCR: relationship 6-2 | always true: relationship 4 | always true: relationship 5-1 |
| dToff/dCR = 0 | false | always true: relationship 5-2 | false | power POUT, wherein there is a ratio between the output voltage Vout and the feedback signal Vfb. In some embodiments, the feedback circuit 300 includes a divider circuit formed by plural resistors, wherein the values of the resistors determines the ratio. Taking FIG. 12 as an example, in this embodiment, the feedback circuit 300 includes two resistors Rfb1, Rfb2, wherein the value of the resistor Rfb1 and the value of the resistor Rfb2 determine the ratio between the output voltage Vout and the feedback signal Vfb. For example, when the value of the resistor Rfb1 is 4000 ohms and the value of the resistor Rfb2 is 1000 ohms, the ratio between the output voltage Vout and the feedback signal Vfb is 5:1. That is, the value of the output voltage Vout is 5 times the value of the feedback signal Vfb.

Figure 13:
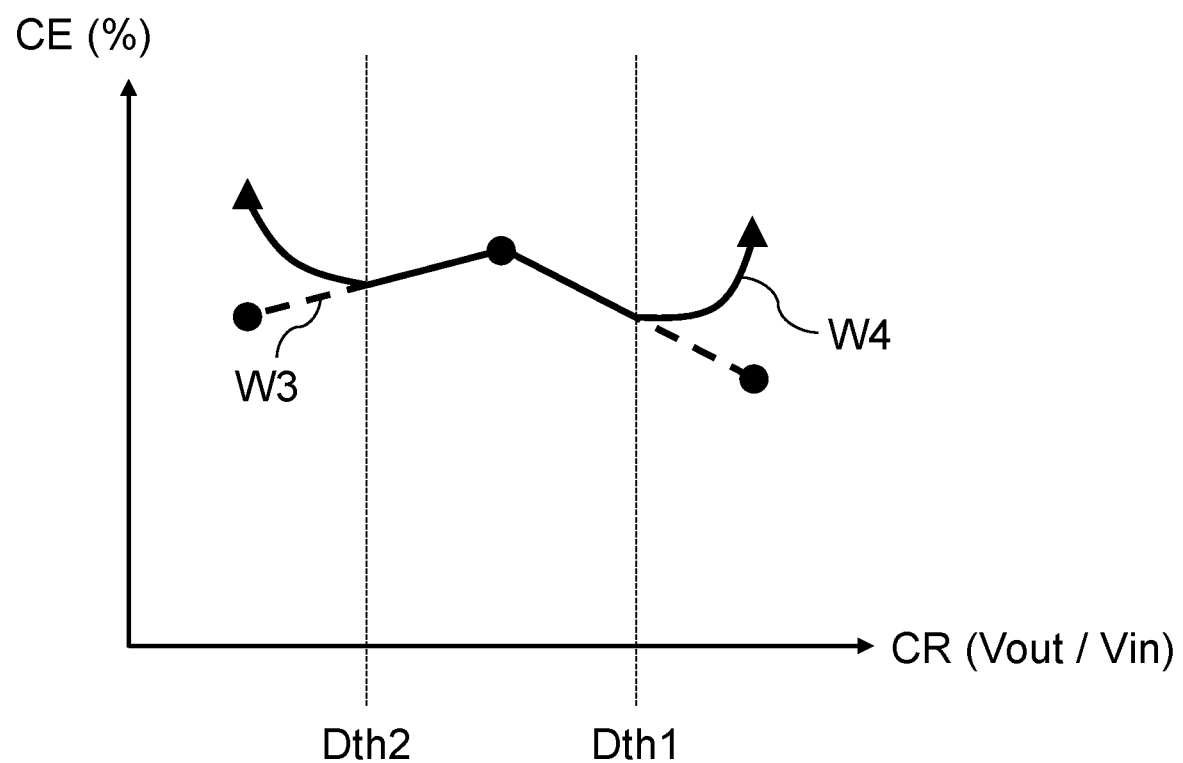
FIG. 13 shows a schematic diagram of conversion efficiency between an input power and an output power of a power stage circuit according to an embodiment of the present invention.

Please refer to FIG. 13. FIG. 13 shows a schematic diagram of conversion efficiency between the input power PIN and the output power POUT of a power stage circuit 100 according to an embodiment of the present invention, wherein waveform W3 shows the conversion efficiency CE of the prior art, and waveform W4 shows the conversion efficiency CE according to an embodiment of the present invention. As shown in FIG. 13, when the conversion ratio CR is higher than the first conversion ratio threshold Dth1, the switching frequency Fs of the PWM signal Spwm according to an embodiment of the present invention decreases as the conversion ratio CR increases, such that the value of the conversion efficiency increases; when the conversion ratio CR is lower than the second conversion ratio threshold Dth2, the switching frequency Fs of the PWM signal Spwm according to an embodiment of the present invention decreases as the conversion ratio CR decreases, such that the value of the conversion efficiency increases.

Figure 14:
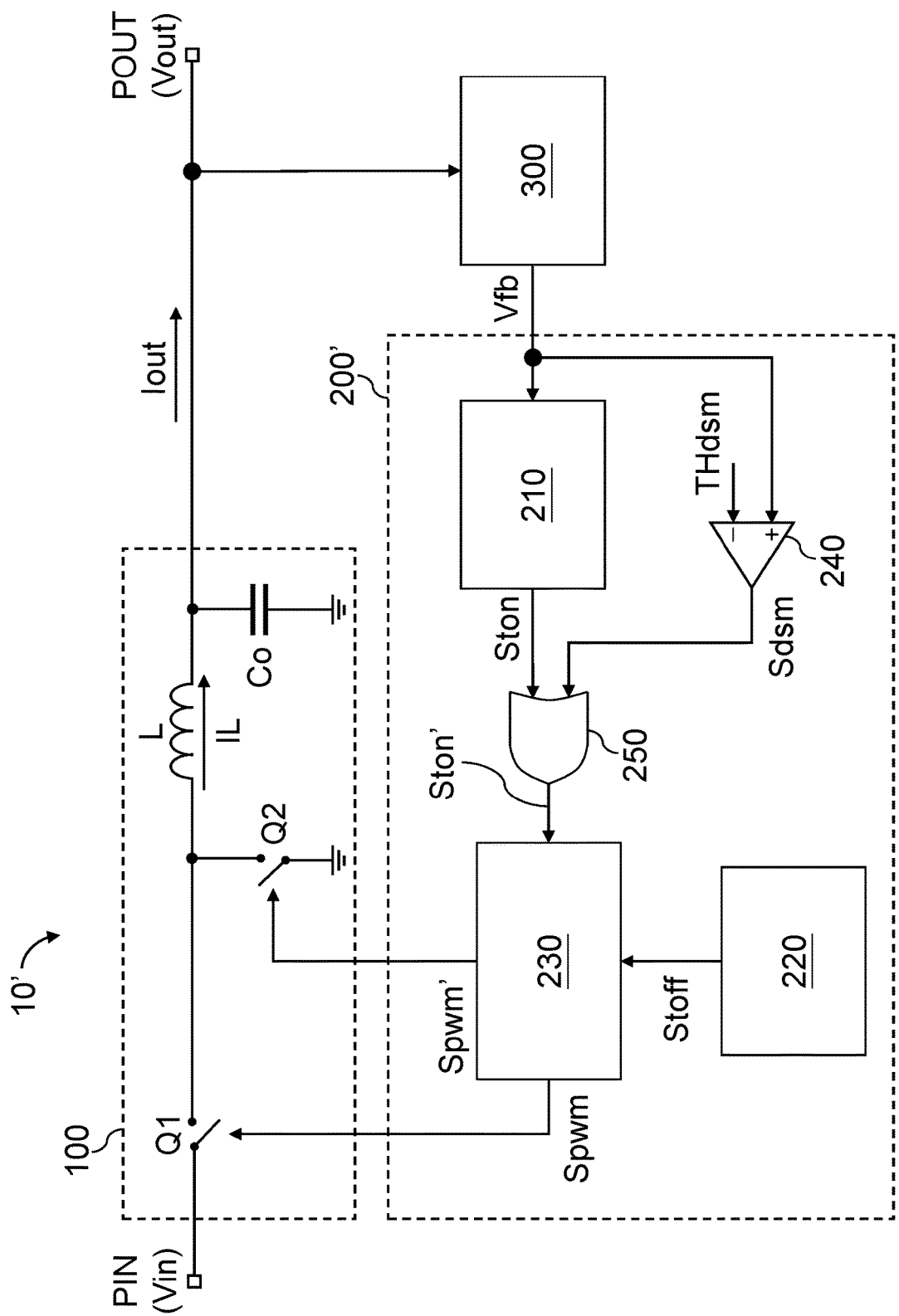
FIG. 14 shows a schematic circuit diagram of a switching power converter according to another embodiment of the present invention.
Figure 15:
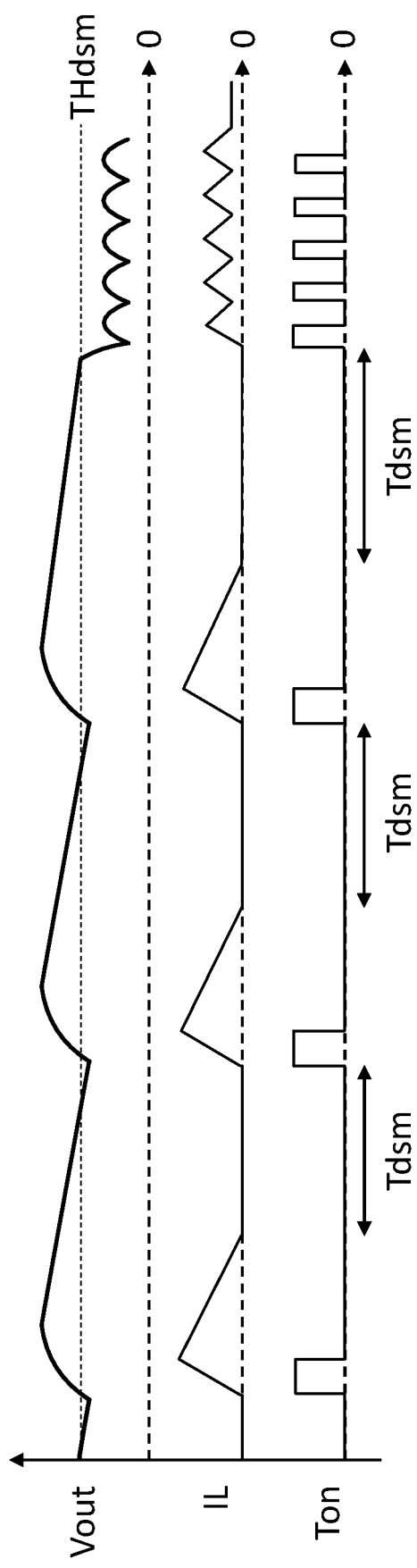
FIG. 15 shows a schematic diagram of signal waveforms of a switching power converter according to another embodiment of the present invention.

Please refer to FIG. 5, FIG. 14, and FIG. 15. FIG. 14 shows a schematic circuit diagram of a switching power converter 10' according to another embodiment of the present invention; FIG. 15 shows a schematic diagram of signal waveforms of the switching power converter 10' according to another embodiment of the present invention. As shown in FIG. 14, in some embodiments, the conversion control circuit 200' further includes a third comparison circuit 240 and an OR gate 250, wherein the third comparison circuit 240 is configured to compare the feedback signal Vfb and a deep sleep threshold THdsm to generate a deep sleep control signal Sdsm, and the OR gate 250 in configured to select the turn-on trigger signal Ston or the deep sleep control signal Sdsm as the turn-on trigger signal Ston' for enabling the PWM signal Spwm. In other embodiments, the third comparison circuit 240 is configured to compare the output voltage Vout and the deep sleep threshold THdsm to generate the deep sleep control signal Sdsm. As shown in FIG. 15, when an inductor current IL of the inductor L turns to 0 and the value of the output voltage Vout is higher than the deep sleep threshold THdsm (which indicates entering a light load status, which is a condition wherein, for example, the output current Iout is lower than a predetermined light load level), the conversion control circuit 200' controls the switching power converter 10' to operate in a deep sleep mode (as shown in the deep sleep region Tdsm). During the deep sleep mode, the conversion control circuit 200' stop providing a bias current to at least one of the error amplifier circuit 211, the ramp signal generation circuit 212 or the first comparison circuit 213 (as shown in FIG. 5), so as to reduce the power consumption of the switching power converter 10'.

In some cases, when the conversion ratio CR is too low such that the on-time is too short, or when the conversion ratio CR is too low such that the increasing slope of the inductor current IL in the on-time Ton is too low, it is possible that when the output current Iout is lower than the predetermined light load level and the inductor current IL decreases to 0, the value of the output voltage Vout is still lower than the deep sleep threshold THdsm. In such cases the conversion control circuit 200' will not enter the deep sleep mode to reduce power consumption. Therefore, in some preferred embodiments, under the condition that the output current Iout of the output power POUT is lower than the predetermined light load level, when the conversion ratio CR is higher than the first conversion ratio threshold Dth1 or lower than the second conversion ratio threshold Dth2, the on-time Ton is increased to extend the time that the inductor current IL is higher than 0, such that when the inductor current IL turns to 0, the value of the output voltage Vout will be higher than the deep sleep threshold THdsm, thereby making the conversion control circuit 200' to enter the deep sleep mode, so as to reduce the power consumption of the switching power converter 10'.

As mentioned above, when the conversion ratio CR between the output voltage Vout and the input voltage Vin of the power stage circuit 100 is higher than the first conversion ratio threshold Dth1 or lower than the second conversion ratio threshold Dth2, the switching power converter 10 and the conversion control circuit 200 thereof of the present invention can effectively decrease the switching frequency Fs of the PWM signal Spwm, so as to improve the conversion efficiency CE between the input power PIN and the output power POUT.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. The various embodiments described above are not limited to being used alone; two embodiments may be used in combination, or a part of one embodiment may be used in another embodiment. For example, other process steps or structures, such as a metal silicide layer, may be added. For another example, the lithography process step is not limited to the mask technology but it can also include electron beam lithography, immersion lithography, etc. Therefore, in the same spirit of the present invention, those skilled in the art can think of various equivalent variations and various combinations, and there are many combinations thereof, and the description will not be repeated here. The scope of the present invention should include what are defined in the claims and the equivalents.

What is claimed is:

1. A conversion control circuit for use in a switching power converter configured to convert an input power to an output power, wherein the switching power converter includes a plurality of switches, the conversion control circuit comprising:

a trigger signal generation circuit, configured to generate a turn-on trigger signal according to a feedback signal relevant to the output power;

an on-time control circuit, configured to generate a turn-off trigger signal to determine an on-time and/or an off-time of a pulse width modulation (PWM) signal, wherein the PWM signal is configured to control the plurality of switches, such that at least one of the plurality of switches is periodically turned on according to the on-time and/or the off-time; and a logic driver circuit, configured to generate the PWM signal according to the turn-on trigger signal and the turn-off trigger signal, wherein the turn-on trigger signal is configured to enable the PWM signal, and the turn-off trigger signal is configured to disable the PWM signal;

wherein the on-time control circuit adjusts the length of the on-time and/or the length of the off-time according to an input voltage of the input power and an output voltage of the output power, wherein when a conversion ratio between the output voltage and the input voltage is higher than a first conversion ratio threshold, a switching frequency of the PWM signal decreases as the conversion ratio increases, and/or when the conversion ratio is lower than a second conversion ratio threshold, the switching frequency decreases as the conversion ratio decreases;

wherein the value of the output voltage is lower than the value of the input voltage; the conversion ratio is a quotient of the value of the output voltage divided by the value of the input voltage; and the first conversion ratio threshold is higher than the second conversion ratio threshold;

wherein the switching frequency is inversely proportional to a total of the on-time and the off-time.

2. The conversion control circuit of claim 1, wherein the trigger signal generation circuit includes:
an error amplifier circuit, configured to amplify a difference between the feedback signal and a first reference voltage to generate an error amplified signal;
a ramp signal generation circuit, configured to generate a first ramp signal; and
a first comparison circuit, configured to compare the first ramp signal and the error amplified signal to generate the turn-on trigger signal.

3. The conversion control circuit of claim 2, wherein the conversion control circuit is operable in a deep sleep mode, wherein the deep sleep mode includes:
entering a sleep mode when an inductor current of the inductor turns to 0 and the output voltage is higher than a deep sleep threshold; and
stop providing a bias current to at least one of the error amplifier circuit, the ramp signal generation circuit or the first comparison circuit during the sleep mode.

4. The conversion control circuit of claim 3, wherein under a condition wherein an output current of the output power is lower than a predetermined light load level, when the conversion ratio is higher than the first conversion ratio threshold and/or lower than the second conversion ratio threshold and the decrease amplitude of the switching frequency is higher than an adjusting threshold such that the inductor current becomes 0, the value of the output voltage is higher than the deep sleep threshold.

5. The conversion control circuit of claim 1, wherein the on-time control circuit includes:
an integration current source, configured to generate an integration current;
an integration capacitor, configured to generate a second ramp signal according to the integration current;
a reset switch, configured to reset the second ramp signal when the PWM signal is disabled;
a second comparison circuit, configured to compare the second ramp signal and a second reference voltage to generate the turn-off trigger signal, thereby determining the length of the on-time and/or the length of the off-time; and
an adjusting current source, coupled to the integration capacitor, the adjusting current source being configured to generate an adjusting current to adjust the length of the on-time and/or the length of the off-time, wherein the level of the adjusting current is determined by the input voltage and the output voltage.

6. The conversion control circuit of claim 5, wherein when the conversion ratio is lower than the first conversion ratio threshold and/or higher than the second conversion ratio threshold, and when the integration current is proportional to the input voltage and the second reference voltage is proportional to the output voltage, the switching frequency is a constant value.

7. The conversion control circuit of claim 5, wherein when the conversion ratio is higher than the first conversion ratio threshold and/or the conversion ratio is lower than the second conversion ratio threshold, the adjusting current adjusts the length of the on-time and/or the length of the off-time according to a variation of the conversion ratio.

8. The conversion control circuit of claim 7, wherein when the conversion ratio is lower than the first conversion ratio threshold and/or the conversion ratio is higher than the second conversion ratio threshold, the value of the adjusting current is 0.

9. The conversion control circuit of claim 7, wherein when the conversion ratio is higher than the first conversion ratio threshold, the adjusting current source determines the adjusting current according to a first predetermined transconductance value corresponding to the input voltage and a second predetermined transconductance value corresponding to the output voltage, thereby adjusting the on-time and/or the off-time to satisfy one of the following relationships, such that the switching frequency decreases as the conversion ratio increases:
that the differential value of the on-time to the conversion ratio and the differential value of the off-time to the conversion ratio are both higher than 0;
that one of the differential value of the on-time to the conversion ratio and the differential value of the off-time to the conversion ratio is 0 and the other is higher than 0; or
that one of the differential value of the on-time to the conversion ratio and the differential value of the off-time to the conversion ratio is positive and the other is negative, wherein the differential value with a positive value is higher than the absolute value of the differential value with a negative value;
wherein, when the conversion ratio is lower than the second conversion ratio threshold, the adjusting current source determines the adjusting current according to a third predetermined transconductance value corresponding to the output voltage and a fourth predetermined transconductance value corresponding to the input voltage, thereby adjusting the on-time and/or the off-time to satisfy one of the following relationships, such that the switching frequency decreases as the conversion ratio decreases:
that the differential value of the on-time to the conversion ratio and the differential value of the off-time to the conversion ratio are both lower than 0;
that one of the differential value of the on-time to the conversion ratio and the differential value of the off-time to the conversion ratio is 0 and the other is lower than 0; or
that one of the differential value of the on-time to the conversion ratio and the differential value of the off-time to the conversion ratio is positive and the other is negative, wherein the absolute value of the differential value with a negative value is higher than the differential value with a positive value.

10. The conversion control circuit of claim 7, wherein when the conversion ratio is higher than the first conversion ratio threshold, the length of the off-time is a constant value.

11. The conversion control circuit of claim 7, wherein when the conversion ratio is lower than the second conversion ratio threshold, the length of the on-time is a constant value.

12. The conversion control circuit of claim 5, wherein the adjusting current source includes a first sub-current source and/or a second sub-current source, the first sub-current source being configured to generate a first sub-current, and the second sub-current source being configured to generate a second sub-current, wherein the first sub-current is configured to adjust the switching frequency when the conversion ratio is higher than the first conversion threshold, such that the switching frequency decreases as the conversion ratio increases; and the second sub-current is configured to adjust the switching frequency when the conversion ratio is lower than the second conversion threshold, such that the switching frequency decreases as the conversion ratio decreases.

13. The conversion control circuit of claim 12, wherein the first sub-current source includes:
a first transconductance circuit, configured to generate a first transconductance current according to the input voltage;
a second transconductance circuit, configured to generate a second transconductance current according to the output voltage; and
a first mirror circuit, configured to generate the first sub-current by mirroring a difference between the second transconductance current and the first transconductance current;
wherein, when the value of the second transconductance current is higher than the value of the first transconductance current, the value of the first sub-current is proportional to the difference between the second transconductance current and the first transconductance current; and when the value of the second transconductance current is lower than the value of the first transconductance current, the value of the first sub-current is 0;
wherein the second sub-current source includes:
a third transconductance circuit, configured to generate a third transconductance current according to the output voltage;
a fourth transconductance circuit, configured to generate a fourth transconductance current according to the input voltage; and
a second mirror circuit, configured to generate the second sub-current by mirroring a difference between the fourth transconductance current and the third transconductance current;
wherein, when the value of the fourth transconductance current is higher than the value of the third transconductance current, the value of the second sub-current is proportional to the difference between the fourth transconductance current and the third transconductance current; and when the value of the fourth transconductance current is lower than the value of the third transconductance current, the value of the second sub-current is 0.

14. The conversion control circuit of claim 13, wherein the first conversion ratio threshold is the conversion ratio when the value of the first sub-current turns to 0, and the second conversion ratio threshold is the conversion ratio when the value of the second sub-current turns to 0.

15. A switching power converter, comprising:
a power stage circuit, which is configured to convert an input power to an output power, the power stage circuit includes a plurality of switches and an inductor;
a conversion control circuit, which is configured to generate a pulse width modulation (PWM) signal according to a feedback signal, and control the plurality of switches according to an on-time of the PWM signal, thereby operating the conversion between the input power and the output power; and
a feedback circuit, which is configured to generate the feedback signal according to the output power,
wherein the conversion control circuit includes:
a trigger signal generation circuit, configured to generate a turn-on trigger signal according to the feedback signal;
an on-time control circuit, configured to generate a turn-off trigger signal to determine an on-time and/or an off-time of the PWM signal; and
a logic driver circuit, configured to generate the PWM signal according to the turn-on trigger signal and the turn-off trigger signal, wherein the turn-on trigger signal is configured to enable the PWM signal, and the turn-off trigger signal is configured to disable the PWM signal;
wherein the on-time control circuit adjusts the length of the on-time and/or the length of the off-time according to an input voltage of the input power and an output voltage of the output power, wherein when a conversion ratio between the output voltage and the input voltage is higher than a first conversion ratio threshold, a switching frequency of the PWM signal decreases as the conversion ratio increases, and/or when the conversion ratio is lower than a second conversion ratio threshold, the switching frequency decreases as the conversion ratio decreases;
wherein the value of the output voltage is lower than the value of the input voltage; the conversion ratio is a quotient of the value of the output voltage divided by the value of the input voltage; and the first conversion ratio threshold is higher than the second conversion ratio threshold;
wherein the switching frequency is inversely proportional to a total of the on-time and the off-time.

* * * * *